(12) United States Patent
Song et al.

(10) Patent No.: US 9,652,140 B2
(45) Date of Patent: May 16, 2017

(54) PAGE SEARCH METHOD AND ELECTRONIC DEVICE SUPPORTING THE SAME

(71) Applicant: Samsung Electronics Co., Ltd., Gyeonggi-do (KR)

(72) Inventors: Sejun Song, Seoul (KR); Boyeon Na, Gyeonggi-do (KR); Yohan Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 174 days.

(21) Appl. No.: 14/167,109

(22) Filed: Jan. 29, 2014

(65) Prior Publication Data

US 2014/0215386 A1 Jul. 31, 2014

(30) Foreign Application Priority Data

Jan. 31, 2013 (KR) ........................ 10-2013-0010906

(51) Int. Cl.
 *G06F 3/048* (2013.01)
 *G06F 3/0485* (2013.01)
 *G06F 3/0488* (2013.01)

(52) U.S. Cl.
 CPC ........ *G06F 3/04855* (2013.01); *G06F 3/0488* (2013.01)

(58) Field of Classification Search
 CPC combination set(s) only.
 See application file for complete search history.

(56) References Cited

U.S. PATENT DOCUMENTS

| 6,147,683 | A  | * | 11/2000 | Martinez | G06F 3/04855 715/786 |
| 6,166,733 | A  | * | 12/2000 | Yamada | G06F 3/04855 707/999.201 |
| 6,204,846 | B1 | * | 3/2001 | Little | G06F 3/04855 715/784 |
| 6,448,986 | B1 | * | 9/2002 | Smith | G06F 3/0481 715/798 |
| 6,738,084 | B1 | * | 5/2004 | Kelley | G06F 3/0481 715/784 |
| 7,475,360 | B2 | * | 1/2009 | Keohane | G06F 3/0485 715/784 |
| 7,676,759 | B2 | * | 3/2010 | Carter | G06F 3/0485 715/721 |
| 7,793,230 | B2 | * | 9/2010 | Burns | G06F 17/30864 707/722 |

(Continued)

OTHER PUBLICATIONS

European Search Report dated Jul. 11, 2016.

*Primary Examiner* — Hien Duong
(74) *Attorney, Agent, or Firm* — Cha & Reiter, LLC

(57) ABSTRACT

The present disclosure relates to a page search function, and provides a page search method and electronic device supporting the same. The page search method for an electronic device includes: identifying information elements contained in a page to be output on a display unit of the electronic device; assigning indexes to the information elements for distinction in consideration of types of the information elements; arranging the indexes on a scroll bar region corresponding to the page; and outputting a composite scroll bar containing the scroll bar region on which the indexes are arranged.

25 Claims, 14 Drawing Sheets

(56) References Cited

U.S. PATENT DOCUMENTS

| | | | |
|---|---|---|---|
| 8,751,956 B2* | 6/2014 | Wilairat | G06F 3/04855 715/786 |
| 8,977,982 B1* | 3/2015 | Amacker | G06F 3/014 715/784 |
| 9,075,492 B1* | 7/2015 | Scott | G06F 3/048 |
| 9,329,744 B2* | 5/2016 | Treitman | G06F 3/048 |
| 2002/0063737 A1* | 5/2002 | Feig | G06F 3/04847 715/786 |
| 2002/0109728 A1* | 8/2002 | Tiongson | G06F 3/04855 715/786 |
| 2002/0186252 A1* | 12/2002 | Himmel | G06F 3/04855 715/787 |
| 2004/0085364 A1 | 5/2004 | Keely et al. | |
| 2005/0210403 A1* | 9/2005 | Satanek | G06F 3/04855 715/786 |
| 2006/0010140 A1* | 1/2006 | Sauermann | G06F 17/30572 |
| 2006/0184901 A1* | 8/2006 | Dietz | G06F 3/04855 715/855 |
| 2006/0277488 A1* | 12/2006 | Cok | G06F 3/04855 715/784 |
| 2007/0036371 A1* | 2/2007 | Buil | G06F 17/3025 381/312 |
| 2007/0088678 A1* | 4/2007 | Farago | G06F 17/30029 |
| 2007/0132789 A1* | 6/2007 | Ording | G06F 3/0485 345/684 |
| 2007/0143705 A1* | 6/2007 | Peters | G06F 3/04855 715/786 |
| 2007/0174790 A1* | 7/2007 | Jing | G06F 17/30265 715/838 |
| 2008/0178116 A1* | 7/2008 | Kim | G06F 3/04855 715/786 |
| 2008/0222570 A1* | 9/2008 | MacLaurin | G06F 17/30554 715/839 |
| 2010/0058226 A1* | 3/2010 | Flake | G06F 3/0481 715/786 |
| 2010/0077353 A1* | 3/2010 | Moon | G06F 3/0482 715/832 |
| 2010/0298034 A1* | 11/2010 | Shin | G06F 3/04883 455/566 |
| 2010/0304791 A1 | 12/2010 | Lee et al. | |
| 2011/0022985 A1 | 1/2011 | Ording et al. | |
| 2011/0055753 A1* | 3/2011 | Horodezky | G06F 3/04883 715/810 |
| 2011/0208732 A1* | 8/2011 | Melton | G06F 17/30896 707/728 |
| 2011/0265039 A1* | 10/2011 | Lyon | G06F 3/04855 715/830 |
| 2012/0030614 A1* | 2/2012 | Tuli | G06F 3/04855 715/786 |
| 2012/0036428 A1* | 2/2012 | Tsuda | G06F 3/048 715/252 |
| 2012/0042279 A1* | 2/2012 | Naderi | G06F 3/04855 715/786 |
| 2013/0132892 A1* | 5/2013 | Lentz | G06F 3/04855 715/786 |
| 2013/0263044 A1* | 10/2013 | MacLaurin | G06F 3/04855 715/786 |
| 2014/0033099 A1* | 1/2014 | Treitman | G06F 3/048 715/768 |
| 2014/0059482 A1* | 2/2014 | Won | G06F 3/04855 715/787 |
| 2014/0129564 A1* | 5/2014 | Kritt | G06F 3/0482 707/741 |

\* cited by examiner

FIG. 12
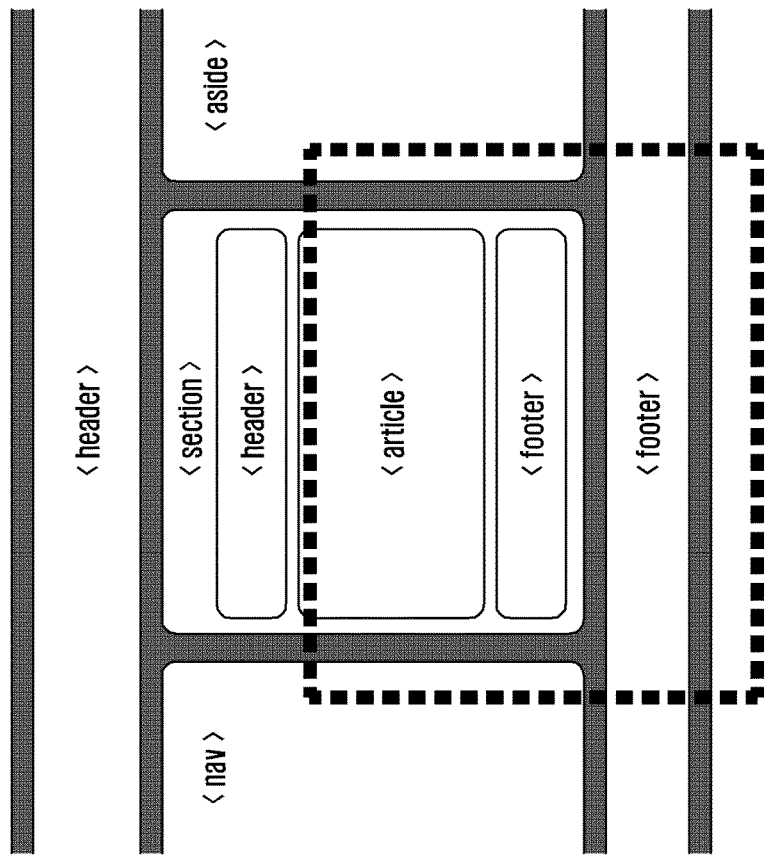
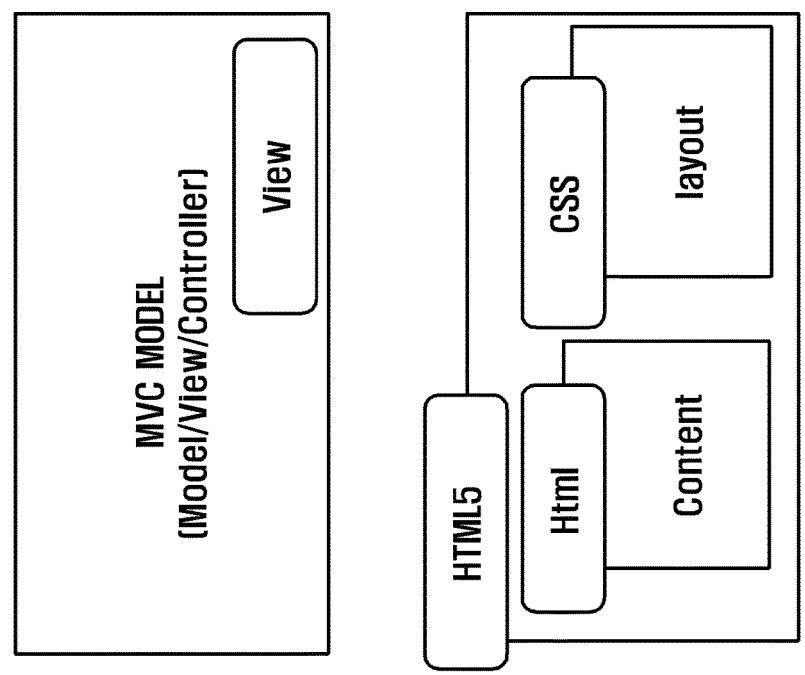

PAGE SEARCH METHOD AND ELECTRONIC DEVICE SUPPORTING THE SAME

CLAIM OF PRIORITY

This application claims the benefit under 35 U.S.C. §119(a) of a Korean patent application filed on Jan. 31, 2013 in the Korean Intellectual Property Office and assigned Serial No. 10-2013-0010906, the entire disclosure of which is hereby incorporated by reference.

TECHNICAL FIELD

The present disclosure relates to the manipulation of pages displayed on an electronic device. More particularly, the present disclosure relates to a page search method and an electronic device supporting the page search method and that produces indexes to contents of one or more pages on the basis of page regions in an integrated manner so that a page search can be easily performed using the indexes.

BACKGROUND

Mobile terminals that support communication are widely used due to their small size and portability. Recently, increased touchscreen sizes, and hardware and software support enabling digital content diversification have dramatically increased the popularity of mobile terminals.

Mobile terminals that have an increased screen size and therefore lesser display constraints are able to actively employ more functions enabling mobile terminals to receive and output a greater variety of types of information. For example, a server page search function of a server page that has a relatively larger size than the screen may now be executed on a mobile terminal for page reception and search. Here, as a server page has a size that is larger than the screen size, the user of a mobile terminal uses a scroll function or the like to view a hidden portion of the server page. Since viewing a large server page using a mobile terminal having a limited screen size may require a considerable number of scroll actions, user wishing to view a number of server pages may find such actions to be inconvenient.

Since viewing the desired contents in a hidden section of a server page using a mobile terminal supporting simple scroll operations only, the user may have to repeat scroll actions, the user interface of such mobile terminals is not user friendly. Additionally, when scroll operation is performed too fast, desired contents may be skipped. Therefore, the user of such devices may be inconvenienced by having to perform additional steps or manipulation of the device to view the skipped contents.

SUMMARY

In aspect of the present disclosure some or all of the above mentioned problems are addressed. For example, an aspect of the present disclosure may be to provide a page search method and electronic device supporting the same that analyzes contents of a page and produces classified indexes, such as, indexes having classifications, to the contents so that a page search can be easily performed by using the indexes.

In accordance with an embodiment of the present disclosure, an electronic device supporting page search may be provided in which the electronic device may include: a display unit to output a page containing information elements and a composite scroll bar containing indexes to the information elements, and a control unit to control a process of analyzing contents of a page to be output on the display unit to identify information elements in the page, assigning indexes to the information elements in consideration of the types of the information elements, and outputting a composite scroll bar containing a scroll bar region, corresponding to the page, on which the indexes are arranged.

In accordance with another embodiment of the present disclosure, a page search method for an electronic device may be provided in which a page search method may include: analyzing contents of the server page to identify information elements in the server page in response to a server page being output; identifying types and positions of the information elements excluding text elements; assigning indexes to the information elements in consideration of types of the information elements; creating a composite scroll bar by arranging the indexes on a scroll bar region corresponding to the size of the server page so that positions of the indexes in the scroll bar region correspond to positions of the associated information elements within the server page; and outputting the composite scroll bar.

In accordance with another embodiment of the present disclosure, a page search method for an electronic device may be provided, the page search method may include: identifying information elements contained in a page to be output on a display unit of the electronic device; assigning indexes to the information elements for distinction in consideration of types of the information elements; arranging the indexes on a scroll bar region corresponding to the page; and outputting a composite scroll bar containing the scroll bar region on which the indexes are arranged.

In another embodiment of the present disclosure, the page search method and electronic device supporting the same facilitate rapid and easy performance of a search for desired contents in a page. For example, in an aspect of the present disclosure, intuitive information may be provided on the distribution of contents in a page, and may enable an accurate and rapid transition to desired contents of a page to be displayed. In an aspect of present disclosure, smooth content referencing and returning to the original position in a page may be facilitated.

These and other aspects of the present disclosure are more fully described hereinbelow with reference to the accompanying figures.

BRIEF DESCRIPTION OF THE DRAWINGS

FIG. 12 illustrates design of a server page to which a composite scroll bar is applied according to the present disclosure;

DETAILED DESCRIPTION

Figure 1:
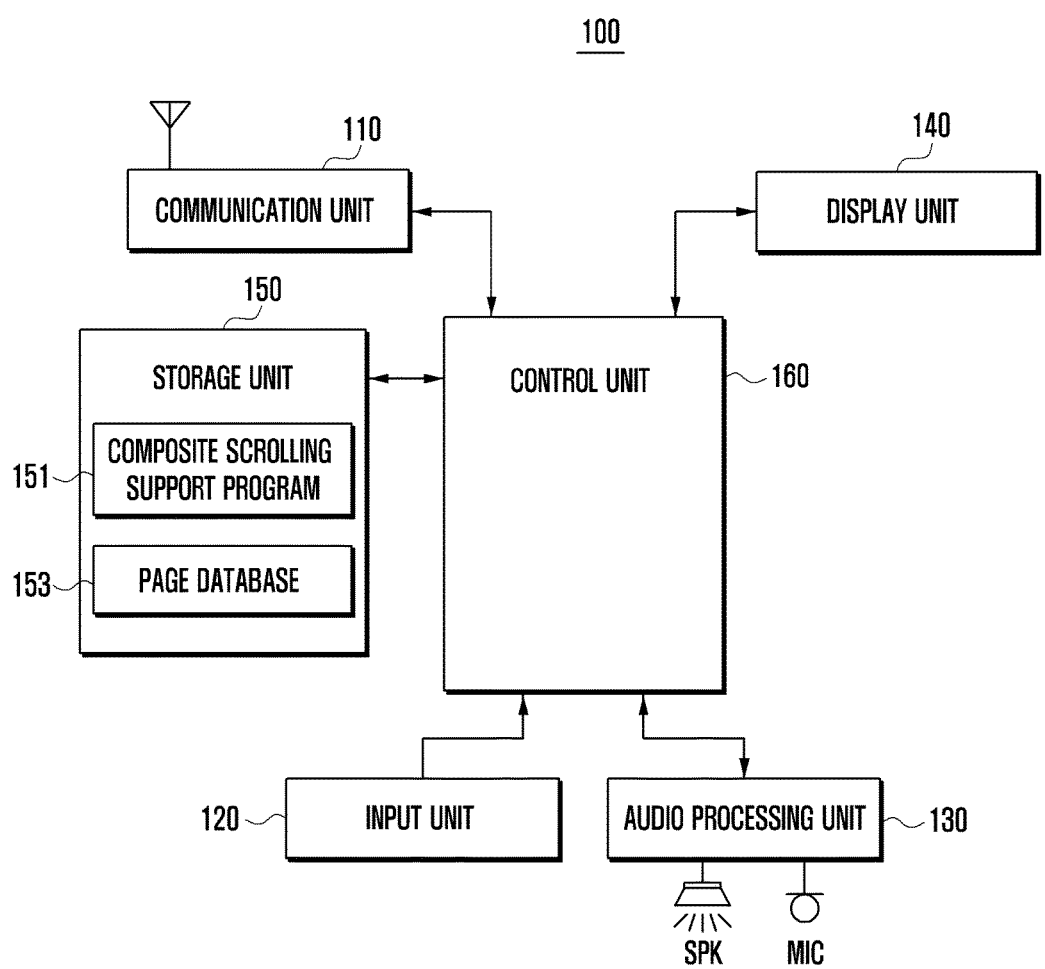
FIG. 1 is a block diagram of a mobile terminal supporting improved page searching according to an embodiment of the present disclosure.

Hereinafter, embodiments of the present disclosure are described in detail with reference to the accompanying drawings in which like reference numbers identify the same or similar elements.

Detailed descriptions of well-known functions and structures incorporated herein may be omitted to avoid obscuring the subject matter of the present disclosure. Detailed descriptions of components having substantially the same configurations and functions may also be omitted.

In the drawings, some elements are exaggerated or only outlined in brief, and thus may be not drawn to scale. The present disclosure is not limited by relative sizes of objects and intervals between objects in the drawings.

Hereafter, description will be made by taking a mobile terminal as example of electronic device. Those skilled in the art will understand that the present disclosure is applicable to any suitable type of electronic device.

FIG. 1 is a block diagram of a mobile terminal 100 supporting page searching according to an embodiment of the present disclosure.

Referring to FIG. 1, the mobile terminal 100 of the present disclosure may include a communication unit 110, an input unit 120, an audio processing unit 130, a display unit 140, a storage unit 150, and a control unit 160.

When a server or document page having a size larger than the screen size of the display unit 140 is output on the display unit 140, the mobile terminal 100 having the above configuration examines the types of information elements of the page, identifies positions of the information elements within the page, and generates and outputs a composite scroll bar. Here, the output composite scroll bar corresponds in size to the size of the whole page, and indexes output on the composite scroll bar have identification values and positions corresponding to the information elements. That is, the position of an index in the composite scroll bar corresponds to the position of an information element (indicated by the index) in the whole page. Hence, when the user selects a particular index in the composite scroll bar, the mobile terminal 100 may output a page region containing an information element corresponding to the selected index on the display unit 140. In addition, the mobile terminal 100 may perform various operations related to page search, such as arrangement of multiple indexes, combination of indexes, selection of a combined index, manipulation of a combined thumbnail for combined indexes, enlargement and reduction of a composite scroll bar, and return to the previous position before index selection.

The communication unit 110 is configured to support communication of the mobile terminal 100. The communication unit 110 may receive a specific server page, to which an enhanced page search function of the present disclosure is to be applied. To this end, the communication unit 110 may establish a communication channel to a server apparatus providing server pages. Here, a server page is a page managed and provided by a server apparatus, such as a web page, cloud server support page or electronic document page, and may be of a specified type such as an HTML type. The communication unit 110 may receive thumbnail images contained in a server page from a server apparatus providing the server page. Here, the communication unit 110 may receive thumbnail images before actual contents of the corresponding server page are completely received. That is, in response to a request for a server page, the mobile terminal 100 may receive thumbnail images related to information elements of the server page and create a composite scroll bar on the basis of the thumbnail images first. Later, when a thumbnail image is selected as an output request for a corresponding information element, the communication unit 110 may receive the requested information element from the server apparatus. This may increase the speed of data transfer and reduce the total amount of transmitted data. Alternatively, the communication unit 110 may receive a requested server page from a server apparatus first and may then receive thumbnail images related to information elements of the received server page. The server page and thumbnail images received by the communication unit 110 may be output on the display unit 140 or may be temporarily or semi-permanently stored in the storage unit 150 under control of the control unit 160.

The communication unit 110 may include one or more communication modules supporting specific communication schemes. For example, the communication unit 110 may include at least one communication module supporting 2G, 3G or 4G mobile communication. The control unit 160 may activate the communication unit 110 according to a user request and control the communication unit 110 to establish a communication channel to receive a specific server page according to the type of a requested service.

The input unit 120 is configured to generate various input signals for manipulation of the mobile terminal 100. The input unit 120 may include specific keys such as a button key, side key and home key, and further include a virtual touch pad to support a full touchscreen feature. Here, the virtual touch pad may be displayed on the display unit 140 to generate an input signal corresponding to a user touch gesture. In particular, the input unit 120 may generate an input signal for receiving and outputting a server page, generate an input signal for displaying a document page stored in the storage unit 150, and generate an input signal for invoking a page containing specific information elements according to a user request or preset scheduling information. When a composite scroll bar is not output by default in a state where a specific page is output on the display unit 140, the input unit 120 may generate an input signal for activating a composite scroll bar and generate an input signal for selecting a desired one of indexes contained in the activated composite scroll bar. When a combined thumbnail is output in response to selection of an index, the input unit 120 may generate an input signal for selecting a specific thumbnail and generate an input signal for returning to the previous position before index selection was made. In addition to key buttons, touch gestures generated on a composite scroll bar output on the display unit 140 may be used as an input signal. The generated input signal may be sent to the control unit 160 and be used as a command to execute a corresponding function.

The audio processing unit 130 is configured to process various audio signals generated in the course of operating the mobile terminal 100. To this end, the audio processing unit 130 may include a speaker SPK to output an audio signal generated or decoded by the mobile terminal 100, and include a microphone MIC to collect an audio signal for a voice or video call or recording. The audio processing unit 130 may produce various sound notifications and sound effects needed for the enhanced page search function. For example, when one of indexes is selected, the audio processing unit 130 may output information related to the selected index as an audio signal. When a combined index is selected, the audio processing unit 130 may output guide information on the selected combined index. Additionally, when an activation request for a specific page is issued, the audio processing unit 130 may output guide information on output of a composite scroll bar for the page. Output of guide information or a sound notification may be skipped according to user settings.

The display unit 140 is configured to output various functional screens needed for usage of the mobile terminal 100. For example, the display unit 140 may provide a variety of screens related to settings and functions provided by the mobile terminal 100, such as a menu screen, multi-icon screen, multi-widget screen, standby screen and lock screen. In particular, the display unit 140 may provide a variety of page screens. For example, the display unit 140 may output a screen for a server page provided by a server apparatus after connection thereto, and output a document screen according to invocation of a document (e.g., in response to selection of a particular screen from the variety of screens provided). Here, for the enhanced page search function of the present disclosure, a composite scroll bar may be applied to a page output on the display unit 140. A composite scroll bar may be applied to a page that may include information elements of different types and has a size larger than the screen size of the display unit 140. When a page is output in part on the display unit 140, the composite scroll bar may be output at a portion of the display unit 140 by default or according to generation of a user requested event. The position or size of a composite scroll bar output on the display unit 140 may be changed according to user manipulation, and shapes and colors of indexes contained in the composite scroll bar may be changed correspondingly. Output and usage of the composite scroll bar are described in more detail later with reference to accompanying screen representations.

The storage unit 150 may store a variety of programs needed for operation of the mobile terminal 100, and a variety of data generated during operation thereof. For example, the storage unit 150 may store programs such as an operating system needed for operation of the mobile terminal 100. In particular, to support the enhanced page search function of the present disclosure, the storage unit 150 may store a composite scrolling support program 151 and a page database 153.

The composite scrolling support program 151 may include various routines to support the enhanced page search function, and may be loaded onto the control unit 160 to output a composite scroll bar when an input signal or event for invoking the enhanced page search function is generated. The composite scrolling support program 151 may include a routine to output a menu item or icon for selecting the enhanced page search mode, a routine to analyze information elements of a page during the enhanced page search mode (the page itself may be received before or after activation of the enhanced page search mode), and a routine to assign indexes to the information elements according to analysis results. The index assignment routine may include a routine to combine indexes according to preset conditions, a routine to assign thumbnail images to indexes, a routine to assign thumbnail images to combined indexes, and a routine to output a composite scroll bar containing assigned indexes or combined indexes on the display unit 140.

The composite scrolling support program 151 may include a routine to output a page region corresponding to the selected index, a routine to output at least one thumbnail image in response to an index on the composite scroll bar being selected, and a routine to return to the previous position before such index selection has been made. The composite scrolling support program 151 may further include a routine to change shapes or colors of indexes, or information associated therewith according to enlargement of the composite scroll bar.

The page database 153 temporarily or semi-permanently maintains server pages received through the communication unit 110 and document pages stored in the storage unit 150. The page database 153 stores data on types of information elements contained in the server page, data on positions of the information elements within the server page, and data on indexes assigned to the information elements for a server page. Here, index data may correspond to at least one of data on a figure having a specific color, an image assigned to an information element, and a thumbnail image assigned to an information element. Pages, page analysis data, and index data stored in the page database 153 may be provided to the control unit 160 for generation of a composite scroll bar.

The control unit 160 is configured to control signal exchange, data processing, information collection and distribution in the mobile terminal 100 for the enhanced page search function of the present disclosure. In particular, when a specific page is output on the display unit 140, the control unit 160 may analyze information elements contained in the page, assign indexes to the information elements according to the analysis result, and output a composite scroll bar. In response to an event generated on the composite scroll bar, the control unit 160 may perform movement of the page or display additional information on the display unit 140. The control unit 160 may have a configuration as shown in FIG. 2.

Figure 2:
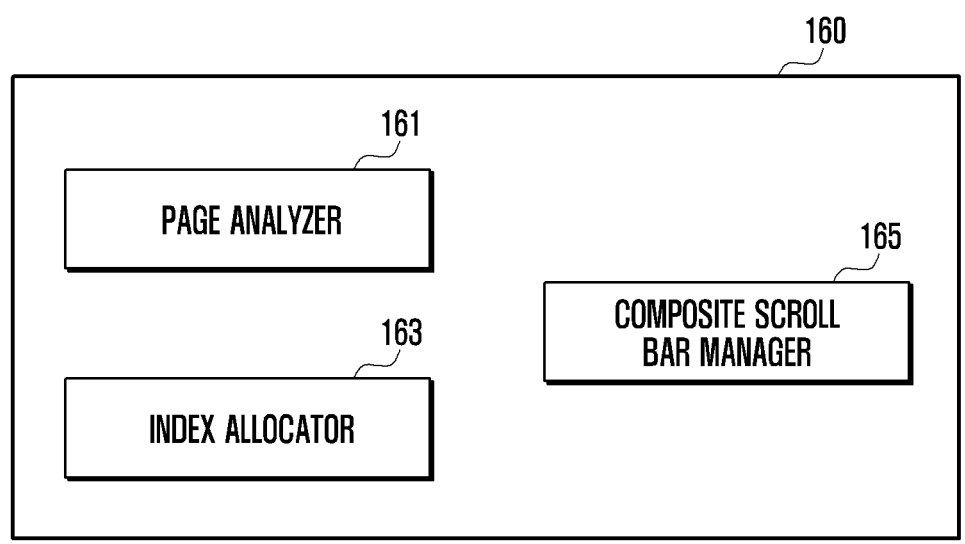
FIG. 2 illustrates a configuration of a control unit in the mobile terminal of FIG. 1.

FIG. 2 illustrates a configuration of the control unit 160 in the mobile terminal 100 according to an embodiment of the present disclosure.

Referring to FIG. 2, the control unit 160 may include a page analyzer 161, an index allocator 163, and a composite scroll bar manager 165.

The page analyzer 161 outputs a menu item or icon for the enhanced page search mode or supports the enhanced page search mode by default. When a specific page is invoked in after the enhanced page search function is activated, or when an event for activating the enhanced page search function is generated after a specific page is invoked, the page analyzer 161 analyzes the page output or to be output on the display unit 140.

For page analysis, the page analyzer 161 classifies contents of the page into information elements such as text, image, and audio. A text information element may be hypertext or text having links. Hypertext or text having links may be treated differently from ordinary text. An image information element may be a still image or a moving image. A still image may be treated differently from a moving image. An audio information element may be a digital rights management (DRM)-protected element or a DRM-unprotected element. Upon completion of classification, the page analyzer 161 identifies positions of the individual information elements within the page. Thereafter, the page analyzer 161 may provide data on the information elements and positions thereof to the index allocator 163.

The index allocator 163 may assign different types of indexes to the classified information elements. For example, the index allocator 163 may assign a type A index (not shown) to a text element, assign a type B index (not shown) to an image element, and assign a type C index (not shown) to an audio element. When information elements are classified in more detail as described before, the index allocator 163 may perform index assignment in more detail according to user settings or shapes of the composite scroll bar. Indexes of type A, B and C may be varied in terms of color, shape or transparency for easy distinction, and may include specific characters representing types of elements such as text, image and audio for intuitive recognition.

Indexes may be changed according to the size of the composite scroll bar and may be replaced with a thumbnail image. Here, an index related to an image element may be replaced with a thumbnail image. To this end, the index allocator 163 may receive thumbnail images of information elements contained in a given page from a server apparatus having providing the page. When a thumbnail image is not available, the index allocator 163 may create a thumbnail image by resizing a corresponding image element and use the thumbnail image as an index to the information element.

The index allocator 163 may assign an index only to an information element of a given type among information elements contained in a page. For example, the index allocator 163 may assign an index only to an image element among information elements contained in the page. Upon completion of index assignment, the index allocator 163 maps indexes with positions of individual information elements and provides the mapping data to the composite scroll bar manager 165.

The composite scroll bar manager 165 may generate a composite scroll bar on the basis of index data and associated position data received from the index allocator 163. The composite scroll bar manager 165 may output the composite scroll bar at a portion of the display unit 140 displaying a page. Here, when the page is scrolled in a vertical direction, the composite scroll bar manager 165 may output the composite scroll bar along the vertical axis of the display unit 140, and when the page is scrolled in a horizontal direction, the composite scroll bar manager 165 may output the composite scroll bar along the horizontal axis of the display unit 140. The composite scroll bar manager 165 generates a composite scroll bar so that the composite scroll bar corresponds to the total length of the page including both the displayed region and the hidden region of the page. The composite scroll bar manager 165 may arrange the indexes in the composite scroll bar so that the position of each index on the composite scroll bar corresponds to the position of a corresponding information element on the page.

When a specific event such as a touch event is generated on the composite scroll bar, the composite scroll bar manager 165 may output a thumbnail image or perform movement on the page according to the touch event. To this end, the composite scroll bar manager 165 may receive thumbnail images and output a selected thumbnail image at a portion of the display unit 140. After selection of an index or thumbnail image, the composite scroll bar manager 165 may automatically return to the previous position before index selection was made. Alternatively, the composite scroll bar manager 165 may output a return item on the composite scroll bar to facilitate return to the previous position before index selection was made.

As described above, the mobile terminal 100 supporting an enhanced page search function of the present disclosure outputs a composite scroll bar having indexes representing types of information elements contained in a page so that the user may intuitively recognize types and positions of the information elements in the page. In addition, the user of the mobile terminal 100 may utilize the composite scroll bar to move to a page region in which a desired information element of a given type is placed in a rapid and easy manner.

Figure 3:
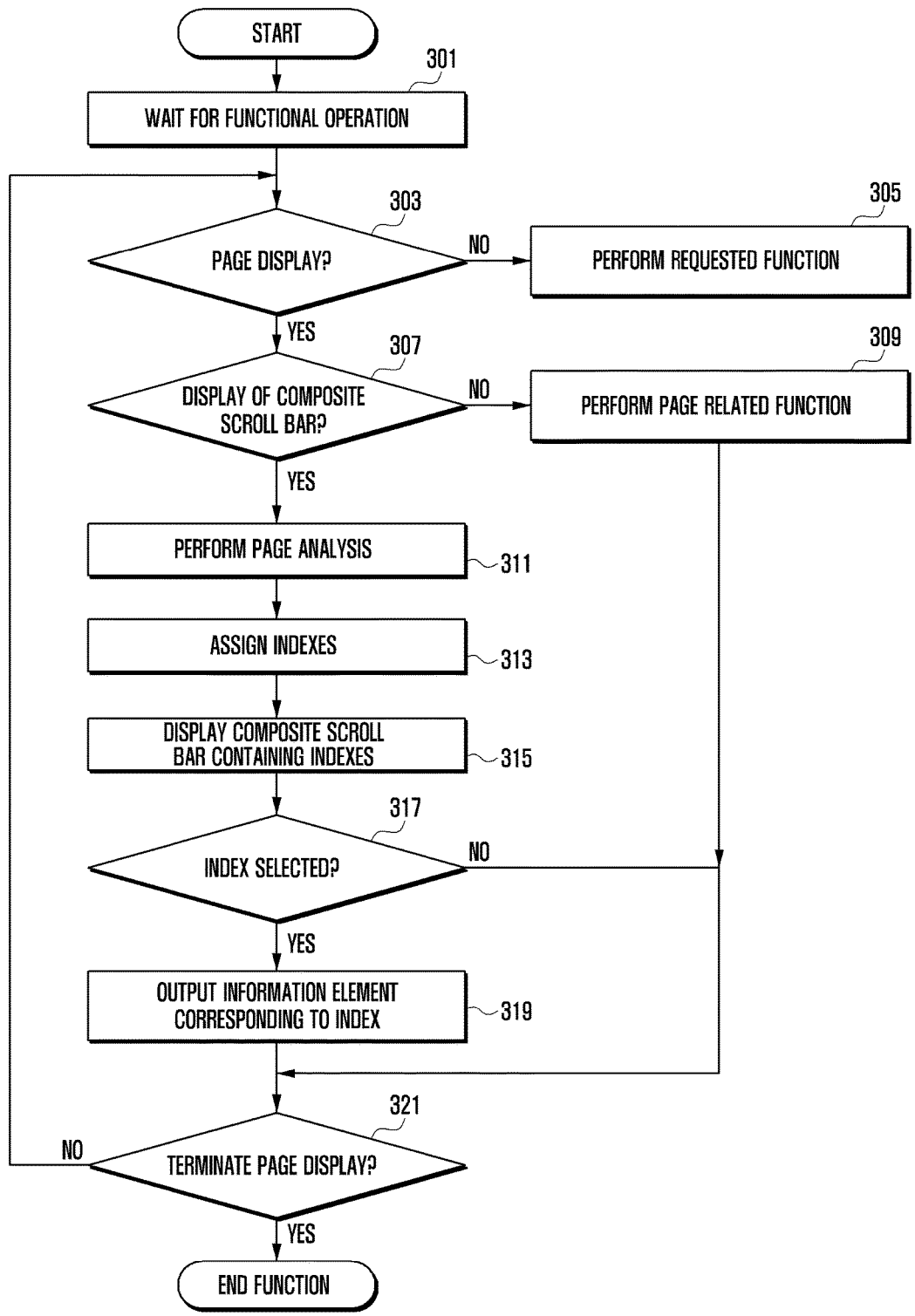
FIG. 3 is a flowchart of a page search method according to an embodiment of the present disclosure.

FIG. 3 is a flowchart of a page search method according to an embodiment of the present disclosure.

Referring to FIG. 3, in the page search method, at operation 301, the control unit 160 of the mobile terminal 100 waits for functional operation. Here, the control unit 160 may enter a sleep state or output a standby screen according to user settings or generation of an event or perform a user requested function. Thereafter, upon generation of an event, at operation 303, the control unit 160 checks whether the event is a page display request. If the event is not a page display request, the control unit 160 proceeds to operation 305 at which the control unit 160 performs a function according to the event. For example, the control unit 160 may perform call handling, broadcast reception, music playback, or the like according to the event type or characteristic.

If the event is a page display request, the control unit 160 proceeds to operation 307 at which the control unit 160 checks whether display of a composite scroll bar is configured. Here, a page may be a server page provided by a specific server apparatus, a document page, or the like. Particularly in the present disclosure, a page may contain information elements of distinct types as contents. As described before, a display configuration of a composite scroll bar may be set when an event for the enhanced page search mode is generated after a page is displayed, or when the enhanced page search mode is activated by default or before a page is displayed.

If display of a composite scroll bar is not configured at operation 307, the control unit 160 proceeds to operation 309 at which the control unit 160 performs a page related function. For example, the control unit 160 may output a received page on the display unit 140, and may perform a scroll operation on the page or perform switching to a page linked with a specific information element according to generation of events.

If display of a composite scroll bar is configured at operation 307, the control unit 160 proceeds to operation 311 at which the control unit 160 performs page analysis. Here, the control unit 160 may classify contents of the page into information elements of distinct types and identify positions of the individual information elements within the page.

At operation 313, the control unit 160 assigns indexes to the individual information elements. Here, the control unit 160 may assign the same index to information elements of the same type. The control unit 160 may assign thumbnail images to information elements as indexes. Following operation 313, the control unit 160 may then proceed to operation 315. At operation 315, the control unit 160 outputs a composite scroll bar containing indexes on the display unit 140.

Following operation 315, the control unit 160 may then proceed to operation 317. At operation 317, the control unit 160 checks whether an input event for index selection is generated. If an input event for index selection is generated, the control unit 160 proceeds to operation 319 at which the control unit 160 outputs an information element corresponding to the selected index. Output of an information element according to index selection (i.e., referencing and moving) is described in more detail with reference to FIGS. 4 and 5. If an input event for index selection is not generated at operation 317, the control unit 160 proceeds to operation 321.

At operation 321, the control unit 160 checks whether an event for terminating page display is generated. If an event for terminating page display is not generated, the control unit 160 returns to operation 303 and repeats the procedure. If an event for terminating page display is generated, the control unit 160 terminates page display and ends the composite scroll bar operation of the present disclosure.

Figure 4:
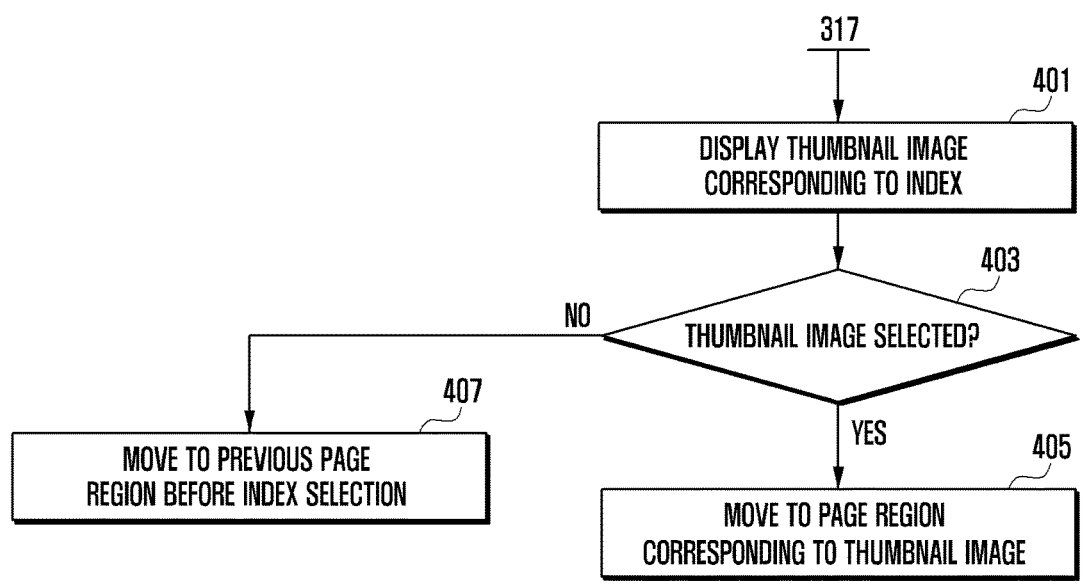
FIG. 4 is a flowchart illustrating a page search method using a composite scroll bar according to an embodiment of the present disclosure.

FIG. 4 is a flowchart illustrating output of an information element in the enhanced page search method according to an embodiment of the present disclosure.

Referring to FIG. 4, in response to an input event for index selection is generated at operation 317, the control unit 160 may proceed to operation 401. At operation 401, the control unit 160 may output a thumbnail image corresponding to the selected index at a portion of the display unit 140. For example, the control unit 160 may output a thumbnail image at a position where the input event for index selection is generated or in a region close to the position. Here, if the selected index is a combined index composed of multiple indexes, the control unit 160 may output a combined thumbnail image composed of multiple thumbnail images corresponding to the merged indexes. When index selection is made, the control unit 160 may control the display unit 140 to output a page region in which the selected index is placed.

At operation 403, the control unit 160 checks whether an event for selecting the thumbnail image is generated. If an event for selecting the thumbnail image is generated, the control unit 160 proceeds to operation 405 at which the control unit 160 performs movement to a page region corresponding to the thumbnail image. That is, the control unit 160 may control the display unit 140 to display a page region corresponding to the selected thumbnail image.

If an event for selecting the thumbnail image is not generated at operation 403 (i.e., the touch gesture for index selection is released), the control unit 160 proceeds to operation 407 at which the control unit 160 performs movement to the previous page region displayed before index selection was made. That is, the control unit 160 may control the display unit 140 to output the previous page region displayed before index selection was made.

The page search function of the present disclosure may support referencing or movement on a page according to the contact sustenance time of a touch gesture. That is, when the user makes a touch gesture for selecting one of indexes output on the composite scroll bar, the mobile terminal 100 may output a page region corresponding to the selected index on the display unit 140. Upon release of the touch gesture, when the time from touch to release is greater than or equal to a preset time, the mobile terminal 100 may sustain display of the page region corresponding to the selected index (movement to a different page region). Alternatively, upon release of the touch gesture, when the time from touch to release is less than the preset time, the mobile terminal 100 may output the previous page region displayed immediately before index selection was made (referencing of a different page region).

An input signal with a contact sustenance time greater than or equal to a preset time may correspond to a long press event. That is, the mobile terminal 100 may perform movement to a different page region or referencing of a different page region according to a long press event or tap event, or according to distinct input events. In addition to index selection, movement to or referencing of a different page region may be applied when multiple thumbnail images are presented on an additional scroll region according to selection of a combined index or multiple indexes. That is, the mobile terminal 100 may perform movement to a different page region or referencing of a different page region according to whether a thumbnail image presented on the additional scroll region is selected by a long press event or tap event.

In addition to use of a long press event or tap event, movement to or referencing of a different page region may be applied according to the direction of a scroll event occurring on the composite scroll bar. For example, in a state wherein a specific index or thumbnail image is selected, the mobile terminal 100 may perform movement to a different page region when a scroll event is generated in a first direction, or may perform referencing of a different page region when a scroll event is generated in a second direction.

Meanwhile, when display mode is changed from the horizontal mode to the vertical mode or from the vertical mode to the horizontal mode, the mobile terminal 100 may change the length of the composite scroll bar and rearrange positions of indexes accordingly. In particular, when the gap between indexes is increased by a preset distance according to adjustment of the length of the composite scroll bar, the mobile terminal 100 may demerge combined indexes. That is, individual indexes may be arranged along on the expanded composite scroll bar according to mode change. In reverse, when the gap between indexes is decreased down to less than a preset distance according to mode change, the mobile terminal 100 may merge individual indexes into combined indexes.

Figure 5:
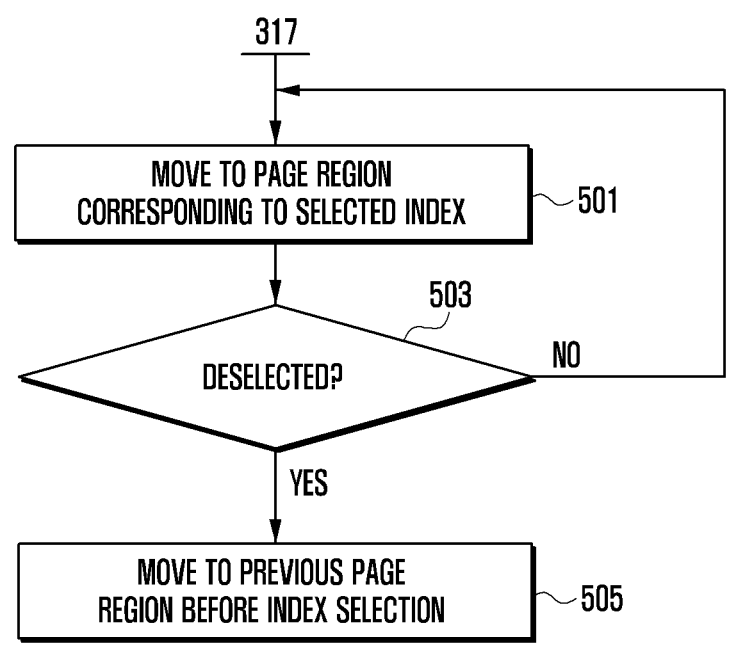
FIG. 5 is a flowchart illustrating another page search method using a composite scroll bar according to an embodiment of the present disclosure.

FIG. 5 is another flowchart illustrating output of information element in the enhanced page search method according to an embodiment of the present disclosure.

Referring to FIG. 5, in response to an input event for index selection is generated at operation 317, the method may then proceed to operation 501. At operation 501, the control unit 160 performs movement of the displayed page to a page region corresponding to the selected index. Here, the control unit 160 may identify the position associated with the selected index within the page and control the display unit 140 to display a page region indicated by the identified position.

At operation 503, the control unit 160 checks whether the input event for index selection is released for de-selection. For example, the control unit 160 may examine whether a touch gesture made for index selection is released. If the input event for index selection is not released yet, the control unit 160 may sustain display of the page region corresponding to the selected index.

If the input event for index selection is released for de-selection, the control unit 160 proceeds to operation 505 at which the control unit 160 performs movement back to the previous page region displayed before index selection was made. That is, the control unit 160 may control the display unit 140 to output the previous page region displayed before index selection was made.

In the above description, touch-down and touch-release are used for returning to the previous page region displayed before index selection was made. However, the present disclosure is not limited thereto. That is, various other input events may be used for returning to the previous page region. This is described further with reference to the accompanying screen representations.

Figure 6:
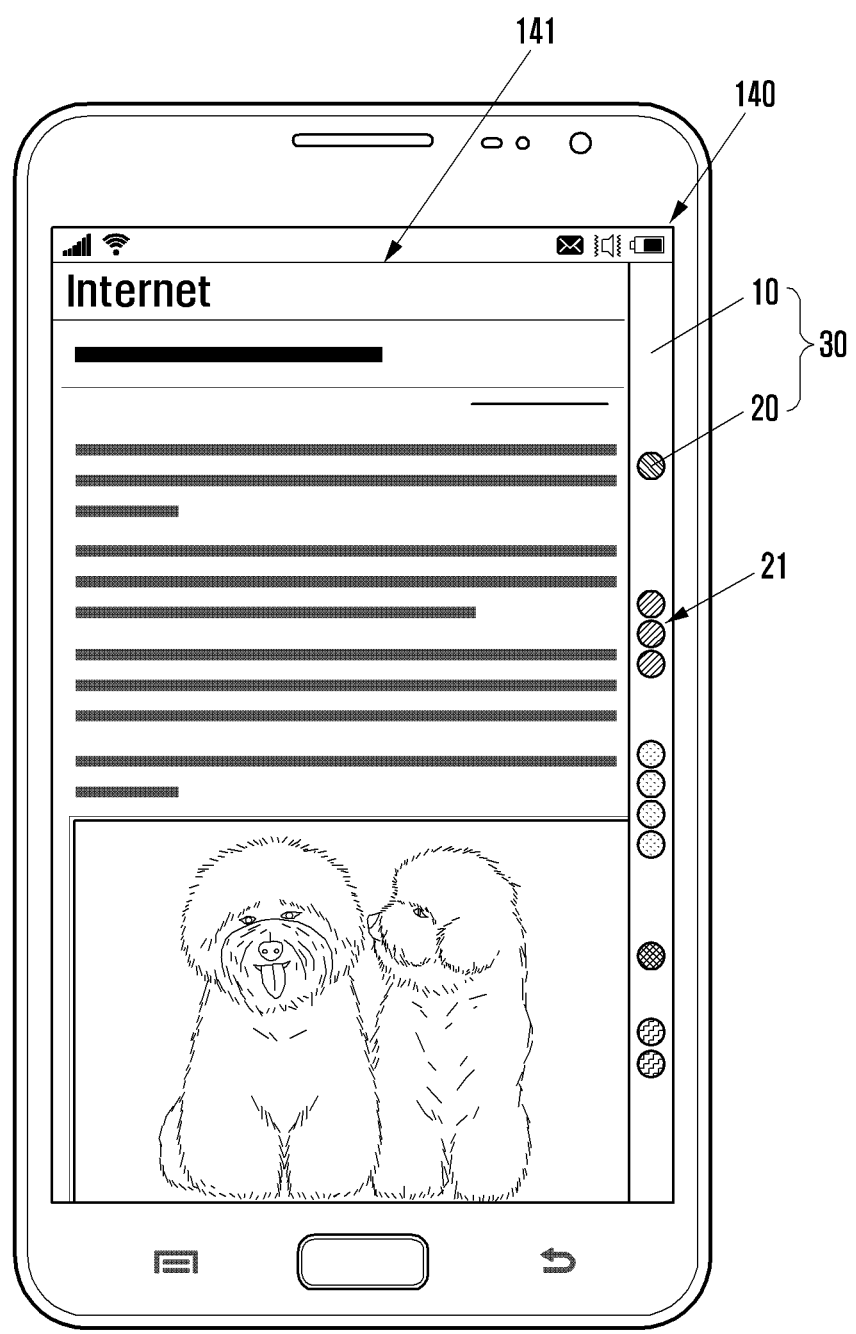
FIG. 6 illustrates a page screen to which a composite scroll bar is applied according to the present disclosure.

FIG. 6 illustrates a screen including a composite scroll bar to support the enhanced page search function according to the present disclosure.

As shown in FIG. 6, the mobile terminal 100 may output a server page 141 according to user manipulation or preset scheduling information. To this end, the mobile terminal 100 may activate the communication unit 110 to connect to a server apparatus using provided address information, receive a server page from the server apparatus, and output the received server page on the display unit 140. Here, when the enhanced page search mode is enabled or an input event for activating the enhanced page search mode is generated, the mobile terminal 100 creates a composite scroll bar 30.

Specifically, the mobile terminal 100 analyzes contents of the server page 141. For example, the mobile terminal 100 may analyze contents of the server page and identifies information elements such as an image, moving image and link. The mobile terminal 100 may assign indexes 20 to the identified information elements including an image, moving image and link, and creates a composite scroll bar 30 having a scroll bar region 10 in which the indexes are arranged. Here, the indexes 20 are arranged on the scroll bar region 10 so that positions of the indexes 20 correspond to positions of associated information elements within the server page 141. Colors or shapes of the indexes 20 may be varied according to types of corresponding information elements. The composite scroll bar 30 may be output at a portion of the server page 141 (for example, at the right edge of the screen). Here, the mobile terminal 100 may output the composite scroll bar 30 as an overlay on the server page 141, or may resize the server page 141 to arrange a space and output the composite scroll bar 30 in the arranged space so that the composite scroll bar 30 does not overlap with the server page 141.

When the gap between indexes 20 on the composite scroll bar 30 is too small, it may be difficult to select a desired one of the indexes 20 through a touch gesture. To deal with this, the mobile terminal 100 may merge indexes 20 arranged within a preset distance on the scroll bar region 10 into a combined index 21. That is, a combined index 21 is a result of merging multiple indexes arranged within a preset distance. When a combined index 21 is selected, an additional scroll region can be provided so that indexes in the combined index 21 may be individually selected. Here, the additional scroll region is a region in which indexes in a combined index 21 are regularly arranged so as to be individually touched for selection. In the additional scroll region, thumbnail images associated with indexes in a combined index 21 may also be regularly arranged so as to be individually touched for selection.

When the number of information elements contained in a page is so large that it is difficult to arrange all corresponding indexes in the composite scroll bar 30, the mobile terminal 100 may output only indexes that are associated with information elements contained in a page region adjacent to the currently displayed page region in the composite scroll bar 30. In this case, when the user makes a touch gesture to move the position of the composite scroll bar 30, the mobile terminal 100 may change the output of indexes on the composite scroll bar 30 to correspond to information elements contained in a different page region other than the one that is currently displayed.

As described above, the mobile terminal 100 supporting the enhanced page search function of the present disclosure may classify contents of a server page 141 into information elements of different types and provides indexes 20 corresponding to the information elements for easy distinction, thereby facilitating a search for a desired information element in the server page 141.

Figure 7:
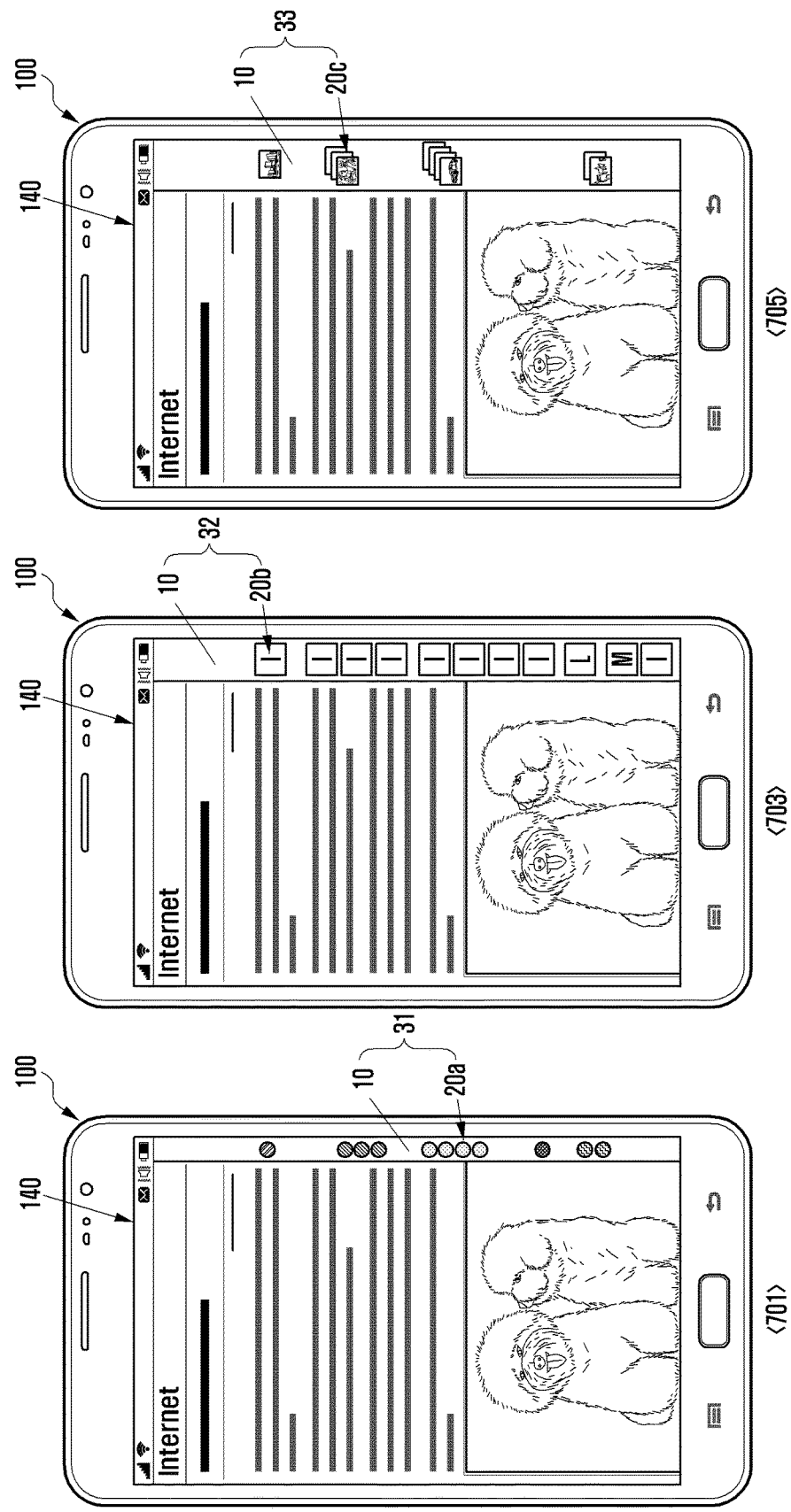
FIG. 7 illustrates various forms of a composite scroll bar according to the present disclosure.

FIG. 7 illustrates various forms of a composite scroll bar 30, (e.g., composite scroll bars 31, 32, and 33) according to an embodiment of the present disclosure.

Referring to FIG. 7, in response to an output request for a server page 141 in the enhanced page search mode, the mobile terminal 100 may output first composite scroll bar 31, containing basic indexes 20a distinguishable by color and a scroll bar region 10, at a portion of the display unit 140 as indicated by indicia 701. The term "indicia" as used herein refers to the display, layout, and/or configuration of one or more indexes at a portion or the display unit 140, e.g., the display, layout, and/or configuration of the scroll bar, e.g., scroll bar 30.

When an input event for expanding the first composite scroll bar 31 is generated, the mobile terminal 100 may output a second composite scroll bar 32 containing descriptive indexes 20b having some information and a scroll bar region 10 as indicated by indicia 703. Here, for switching from the first composite scroll bar 31 to the second composite scroll bar 32, the mobile terminal 100 may provide a separate menu item. The mobile terminal 100 may also perform composite scroll bar switching according to a preset touch gesture. For example, when the user makes a scroll gesture on the first composite scroll bar 31 in a direction different therefrom (e.g., left and right scrolling), the mobile terminal 100 may regard this as a touch gesture for composite scroll bar switching. The mobile terminal 100 may also perform composite scroll bar switching according to reception of a gesture event of a predefined shape.

When the scroll bar region 10 is expanded as in the case of the second composite scroll bar 32 as shown in indicia 703, the mobile terminal 100 may change shapes of indexes to be output on the scroll bar region 10. Here, basic indexes 20a indicating types of information elements through colors may be changed into descriptive indexes 20b having some information. The descriptive indexes 20b may have characters, images or patterns indicating types of corresponding information elements. For example, the descriptive indexes 20b may have a character 'I', 'M' or 'L' to respectively indicate information elements in the form of an image, moving image or link. The descriptive indexes 20b may also have a preset pattern to indicate types of corresponding information elements.

When another or an additional input event for composite scroll bar switching is generated, the mobile terminal 100 may output a third composite scroll bar 33 on the display unit 140 as indicated by indicia 705. Here, the mobile terminal 100 may output the third composite scroll bar 33 as an overlay on the server page 141. Alternatively, the mobile terminal 100 may reduce the size of the server page 141 to arrange a space and output the third composite scroll bar 33 in the arranged space.

In the third composite scroll bar 33, the mobile terminal 100 may change basic indexes 20a into thumbnail indexes 20c. To this end, the mobile terminal 100 may collect thumbnail images of information elements corresponding to the basic indexes 20a. The mobile terminal 100 may receive thumbnail images from a server apparatus having provided the server page 141. When the server apparatus does not provide thumbnail images, the mobile terminal 100 may create thumbnail images of a desired size and resolution by resizing the corresponding information elements. After collection or creation of thumbnail images, the mobile terminal 100 may place the thumbnail images as indexes at positions corresponding to the basic indexes 20a to produce the third composite scroll bar 33. Here, the thumbnail indexes 20c may be arranged so as to correspond to closeness between the basic indexes 20a. Hence, the thumbnail indexes 20c may partially overlap each other. The user may readily identify types and positions of the information elements contained in the server page 141 though the thumbnail indexes 20c and perform a page search in an intuitive manner.

Figure 8:
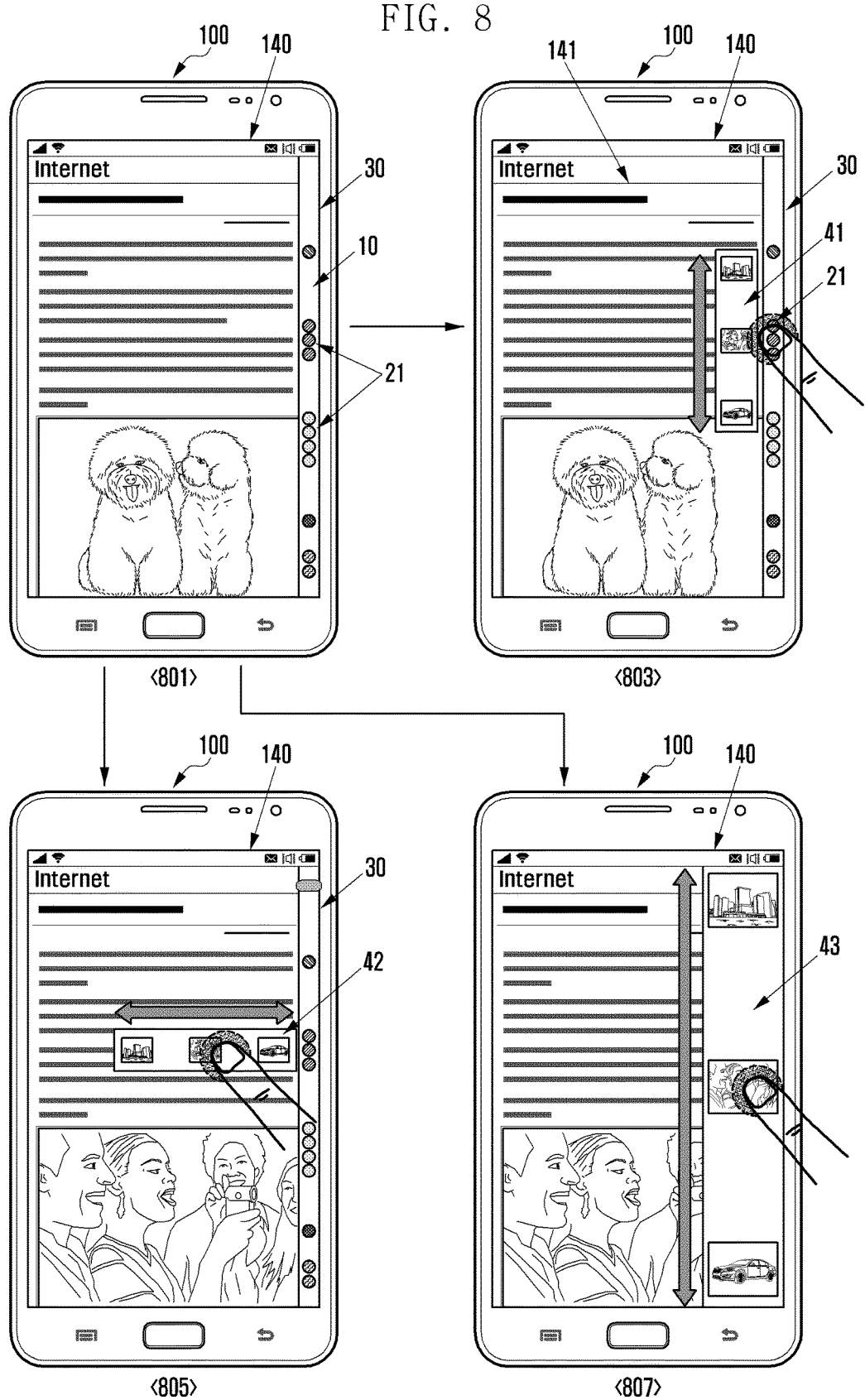
FIG. 8 illustrates an additional scroll region in a composite scroll bar according to the present disclosure.

FIG. 8 illustrates manipulation of combined indexes according to an embodiment of the present disclosure.

As indicated by indicia 801, when indexes to be output are too close to each other on the scroll bar region 10, the mobile terminal 100 may merge the nearby indexes into a combined index 21. When an event for selecting a combined index 21 is generated, the mobile terminal 100 may output an additional scroll region in various forms as indicated by indicia 803, 805 and 807 so that individual indexes contained in the combined index 21 may be selected.

More specifically, upon reception of an event for selecting the combined index 21, the mobile terminal 100 may output a first additional scroll region 41 being long in the vertical direction in a region close to the location of the selection event as indicated by indicia 803. Here, thumbnail images corresponding to indexes contained in the combined index 21 may be output in the first additional scroll region 41. Thereafter, the user may select a desired one of the thumbnail images output in the first additional scroll region 41 through an up or down drag action. When a thumbnail image is selected, the mobile terminal 100 may output a page region containing an information element corresponding to the selected thumbnail image on the display unit 140.

In the first additional scroll region 41 indicated by indicia 803, three thumbnail images are output because three indexes have been merged into the combined index 21. If a combined index 21 containing four merged indexes is selected, four thumbnail images may be arranged in the additional scroll region. The number of thumbnail images arrangeable in the additional scroll region may be limited and the remaining thumbnail images may be output in the additional scroll region according to a drag action occurring thereon. For example, when a combined index containing five merged indexes is selected, the mobile terminal 100 may output three thumbnail images in the additional scroll region first and output the remaining two thumbnail images according to a drag action.

As indicated by indicia 805, upon reception of an event for selecting a combined index 21, the mobile terminal 100 may output a second additional scroll region 42 being long in the horizontal direction in a region close to the location of the selection event. Here, thumbnail images corresponding to indexes contained in the combined index 21 may be arranged at regular intervals in the horizontal direction on the second additional scroll region 42. Thereafter, the user may select a desired one of the thumbnail images output in the second additional scroll region 42 through a left or right drag action. When a thumbnail image is selected, the mobile terminal 100 may output a page region containing an information element corresponding to the selected thumbnail image on the display unit 140.

As indicated by indicia 807, upon reception of an event for selecting a combined index 21, the mobile terminal 100 may output a third additional scroll region 43 being long in the vertical direction in a region of the display unit 140 covering the composite scroll bar 30. Here, thumbnail images of a preset size may be arranged at regular intervals on the third additional scroll region 43. Thereafter, the user may select a desired one of the thumbnail images output in the third additional scroll region 43 through an up or down drag action. Then, the mobile terminal 100 may perform movement on the server page 141 to output a page region containing an information element corresponding to the selected thumbnail image on the display unit 140. Particularly, for clearer content representation, thumbnail images of a given size obtained by resizing original images may be arranged in the third additional scroll region 43. Here, a thumbnail image output in the third additional scroll region 43 may have a size larger than that of a thumbnail image output in the first additional scroll region 41 or in the second additional scroll region 42. When a touch gesture involving selection of a thumbnail image and release is generated, the mobile terminal 100 may output a composite scroll bar on the server page 141 displayed on the display unit 140.

The third additional scroll region 43 may be output when a drag action is performed in a state wherein the first additional scroll region 41 is output. That is, when the user makes a drag gesture in the left and right direction after the first additional scroll region 41 is output, the mobile terminal 100 may enlarge the first additional scroll region 41 according to the touch gesture to thereby output the third additional scroll region 43. Here, the mobile terminal 100 may enlarge the first additional scroll region 41 according to a left or right drag gesture, and may reduce an enlarged additional scroll region according to a left or right drag gesture. This may also be applied to the second additional scroll region 42. That is, when a drag gesture is made in the up or down direction (not in a direction for thumbnail manipulation) after the second additional scroll region 42 is output, the mobile terminal 100 may enlarge the second additional scroll region 42 or may reduce an enlarged additional scroll region according to the drag gesture. When the additional scroll region is enlarged, the size of indexes or thumbnail images therein may also be changed accordingly.

In the above description, some indexes closely arranged in the composite scroll bar 30 may be merged into a combined index. However, the present disclosure is not limited thereto. That is, instead of generating a combined index during creation of a composite scroll bar 30, after output of individual indexes on a composite scroll bar 30, when multiple indexes are simultaneously selected, the mobile terminal 100 may merge the simultaneously selected indexes into a combined index. More specifically, when multiple indexes are arranged in a given range, the user may touch an index with a finger.

When multiple indexes are simultaneously selected with a finger touch, the mobile terminal 100 may treat the simultaneously selected indexes as a combined index. That is, the mobile terminal 100 may output an additional scroll region in which the simultaneously selected indexes are arranged at regular intervals so that each index may be individually selected. As described before, instead of indexes, multiple thumbnail images may be arranged at regular intervals in the additional scroll region.

For example, when three indexes are simultaneously touched by a finger, the mobile terminal 100 may output an additional scroll region in which the three indexes or three thumbnail images corresponding thereto are arranged at regular intervals. When two indexes are simultaneously touched by a finger, the mobile terminal 100 may output an additional scroll region in which the two indexes or two thumbnail images corresponding thereto are separately arranged.

In addition, when information elements are densely arranged, some indexes may be output in an overlapped manner. In this case, the mobile terminal 100 may output only a single index as a representative of the overlapping indexes and output the number of information elements indicated by the single index at a scroll bar region. For example, when three indexes are closely arranged in an overlapped manner, the mobile terminal 100 may output only one index and output a number or character corresponding to "3" at a region near to the output index or on the output index as an overlay. Thereby, the mobile terminal 100 may readily notify the number of information elements arranged in an overlapped manner within a page.

Figure 9:
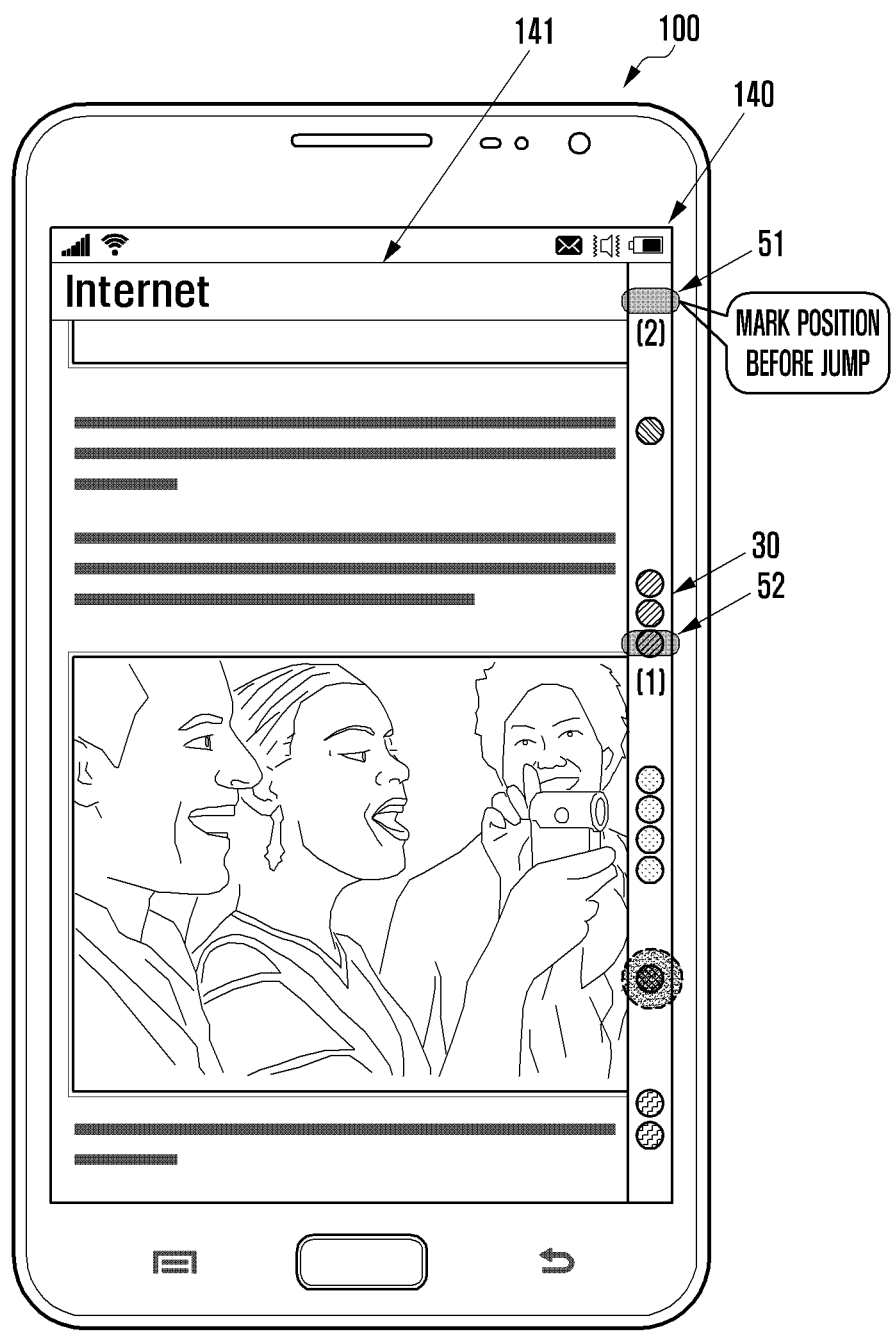
FIG. 9 illustrates display of a previous position during manipulation of a composite scroll bar according to the present disclosure.

FIG. 9 illustrates returning to the previous position in the enhanced page search function of the present disclosure.

Referring to FIG. 9, in response to reception of a server page request, the mobile terminal 100 may examine address data of the server page and connect to a server apparatus through the communication unit 110. Thereafter, the mobile terminal 100 may receive a requested server page from the server apparatus. The mobile terminal 100 may analyze contents of the server page and assign indexes to information elements of the server page according to their types. The mobile terminal 100 may create a composite scroll bar 30 on the basis of the indexes and positions of information elements in the server page and output the composite scroll bar 30 on the display unit 140 as shown in FIG. 9. Here, the mobile terminal 100 may output the server page 141 on the display unit 140 and output the composite scroll bar 30 as an overlay on the server page 141. Alternatively, according to user or designer settings, the mobile terminal 100 may resize the server page 141 to arrange a space and output the composite scroll bar 30 in the arranged space so that the composite scroll bar 30 does not overlap with the server page 141.

The mobile terminal 100 may support returning to the previous position during usage of the composite scroll bar 30. To this end, in a state wherein a region of the server page is output on the display unit 140, when an index is selected on the composite scroll bar 30, the mobile terminal 100 may output a first previous position mark 51 at a portion of the composite scroll bar 30 corresponding to the current page region. For example, when the user selects an index positioned near the middle of the composite scroll bar 30 while viewing a beginning part of the server page 141, the mobile terminal 100 performs movement on the server page 141 according to the selected index. Then, the page region corresponding to the selected index is displayed on the display unit 140. Here, the mobile terminal 100 outputs a first previous position mark 51 pointing to the beginning part of the server page 141 to remember or store the position before index selection.

After selection of the index positioned near the middle of the composite scroll bar 30, for continued viewing, the user may select another index positioned near the lower end of the composite scroll bar 30. Then, the mobile terminal 100 may output a second previous position mark 51 pointing to the page region corresponding to the index positioned near the middle of the composite scroll bar 30. In addition, the mobile terminal 100 may output information on the index selection sequence. For example, the mobile terminal 100 may output a number '1' near the first previous position mark 51 as an overlay and output a number '2' near the second previous position mark 52 as an overlay. To indicate the index selection sequence, the mobile terminal 100 may also output supplementary information or change the color or transparency of the position mark. When the first previous position mark 51 or the second previous position mark 52 is selected, the mobile terminal 100 performs movement to the page region indicated by the selected previous position mark.

Upon expiration of a preset time after output of a previous position mark, the mobile terminal 100 may automatically delete the previous position mark, or may output a menu item to delete the previous position mark and delete the previous position mark when the menu item is selected. The mobile terminal 100 may also delete the previous position mark from the display unit 140 according to generation of a preset touch gesture. Alternatively, when an output previous position mark is selected, the mobile terminal 100 may delete the selected previous position mark from the display unit 140. Here, the mobile terminal 100 may sustain display of an unselected previous position mark and delete the remaining previous position mark according to satisfaction of a preset condition described above. Output of a previous position mark may be enabled by default, or activated or deactivated according to user settings.

Figure 10:
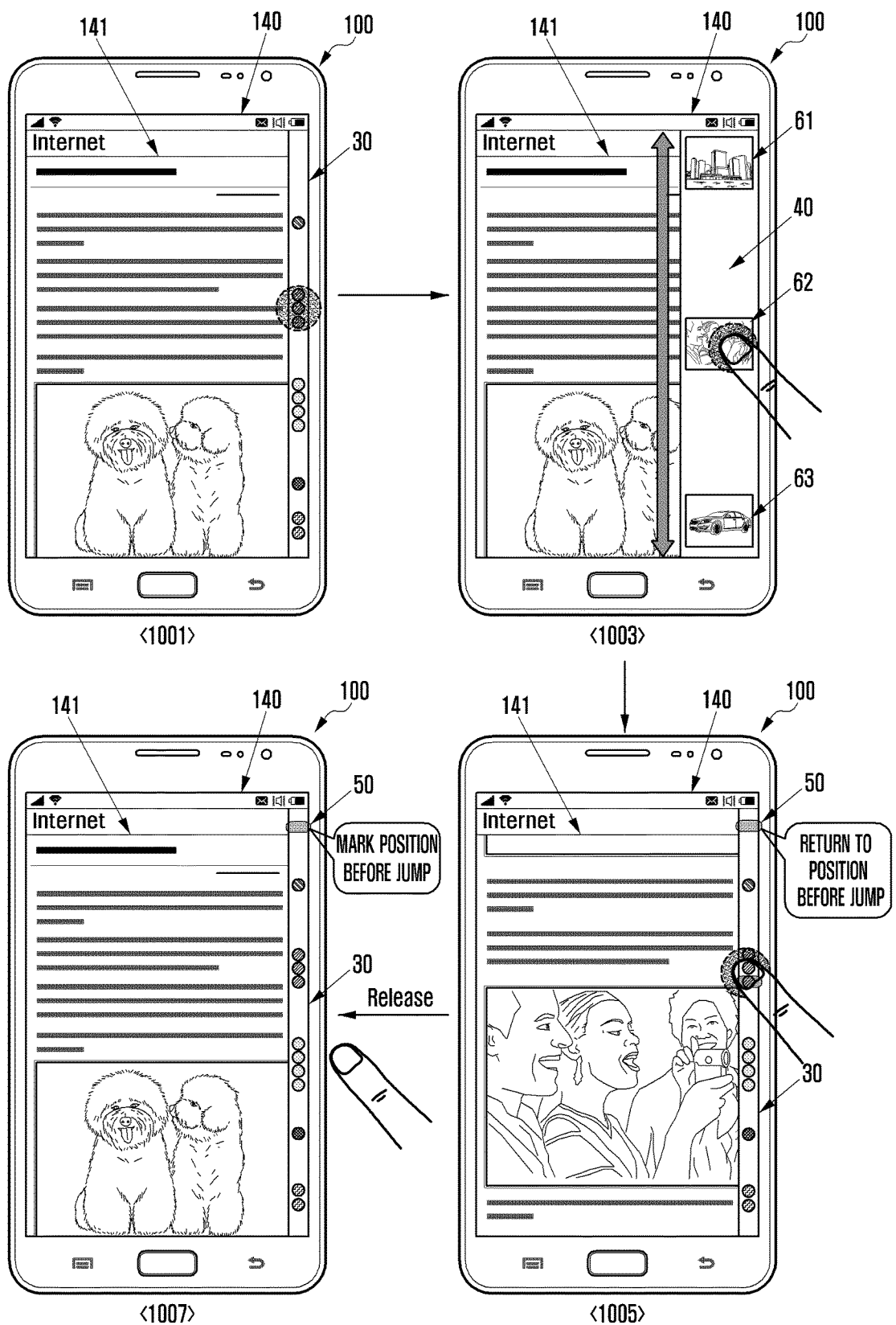
FIG. 10 illustrates page switching and referencing during manipulation of a composite scroll bar according to the present disclosure.

FIG. 10 illustrates another example of returning to the previous position in the enhanced page search function of the present disclosure.

Referring to FIG. 10, the mobile terminal 100 may receive a page according to a user request or preset scheduling information, and output the received page 141 on the display unit 140 as indicated by indicia 1001. Here, the mobile terminal 100 may classify contents of the page 141 into information elements and assign indexes to the information elements of the page 141 according to their types. The mobile terminal 100 may allocate a scroll bar region corresponding to the size of the page 141, arrange the indexes on the scroll bar region so that positions of the indexes correspond to positions of the information elements in the page 141 to produce a composite scroll bar 30, and output the composite scroll bar 30 at a region of the display unit 140. The user may select a specific index on the composite scroll bar 30. Then, the mobile terminal 100 may output a region of the page 141 containing the information element corresponding to the selected index on the display unit 140. For example, when multiple indexes positioned near the middle of the composite scroll bar 30 are selected, as indicated by indicia 1003, the mobile terminal 100 may output an additional scroll region 40 on the display unit 140 to support index selection among the multiple indexes. Here, instead of the additional scroll region 40, the mobile terminal 100 may output an additional scroll region in a different form as described in FIG. 8.

After output of the additional scroll region 40, when a second thumbnail image 62 is selected among first to third thumbnail images 61, 62, and 63 output on the additional scroll region 40, the mobile terminal 100 may output a page region corresponding to the second thumbnail image 62 on the display unit 140 as indicated by indicia 1005. In addition, the mobile terminal 100 may output a previous position mark 50 pointing to a page region output before selection of the second thumbnail image 62.

More specifically, the user may touch an index on the composite scroll bar 30 for selection. Then, the mobile terminal 100 may output the additional scroll region 40 according to index selection. While sustaining touch-down, the user may perform a drag action to select the second thumbnail image 62. The mobile terminal 100 may output a page region corresponding to the second thumbnail image 62 on the display unit 140 while touch-down is sustained. When touch-down is released, the mobile terminal 100 may automatically return to a previous page region output before index selection was made as indicated by indicia 1007. To this end, when a touch gesture is made to select an index on the composite scroll bar 30, the mobile terminal 100 may temporarily store information on the current page region. Thereafter, when the touch gesture for index selection is released, the mobile terminal 100 may output the previous page region indicated by the temporarily stored information on the display unit 140. That is, upon generation of a touch event for selecting a position on the composite scroll bar 30, the mobile terminal 100 may display a page region corresponding to the touched position. Thereafter, upon generation of another touch event, the mobile terminal 100 may automatically display the previous page region output before generation of the touch event selecting the position. Here, the mobile terminal 100 may automatically return to a previous page region according to user settings, or may return to a previous page region through output and selection of a previous position mark as described before.

Figure 11:
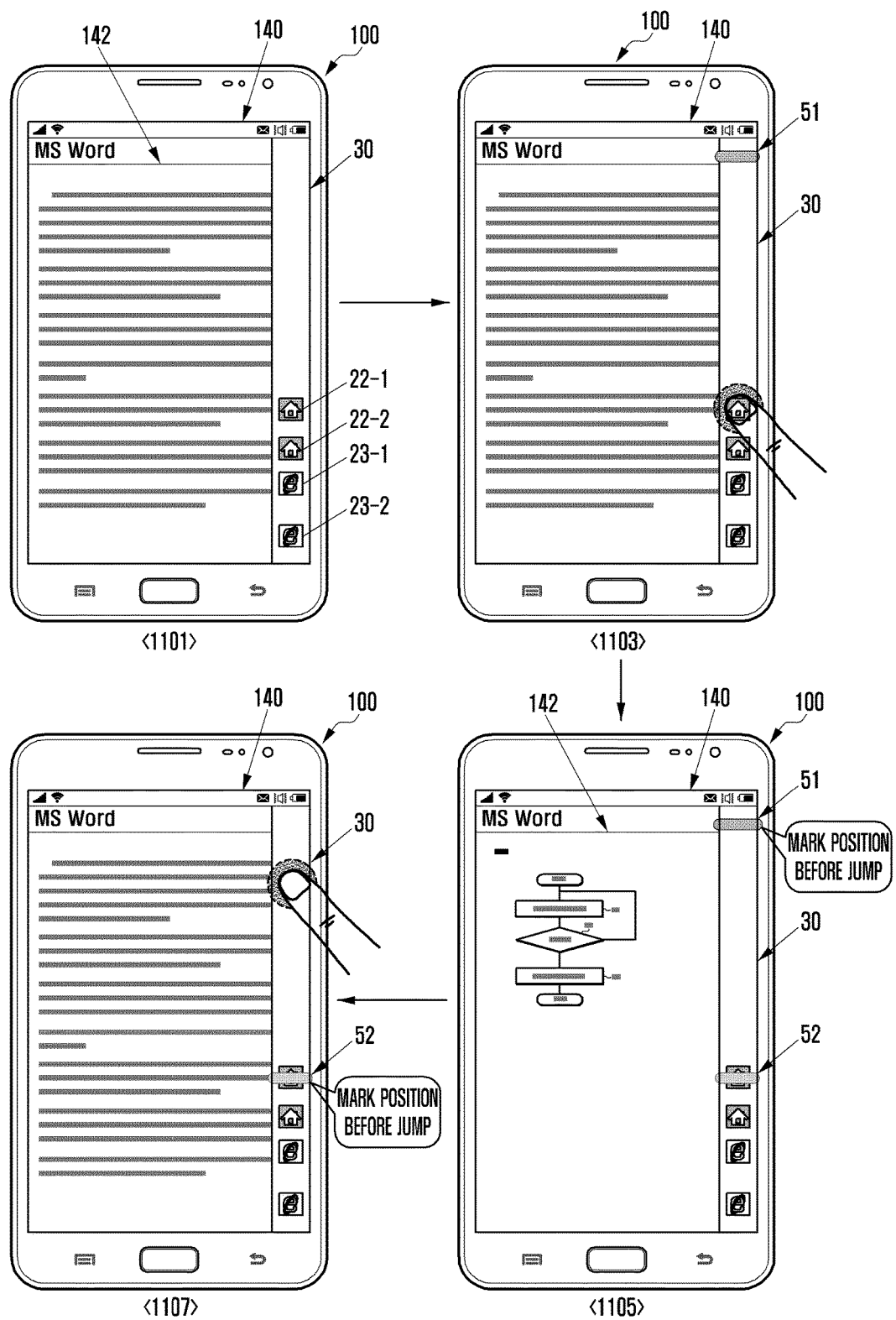
FIG. 11 illustrates a document page to which a composite scroll bar is applied according to the present disclosure.

FIG. 11 illustrates a document page to which the enhanced page search function is applied according to an embodiment of the present disclosure. First, in a document page, picture objects may be distinguished by identifiers or elements defined as shown Table 1.

TABLE 1

| Picture | |
|---|---|
| Description | Picture |
| Parent element | Text |
| Child element | Shapeobject, Shapecomponent, Lineshape, Imagerect. Imageclip, Effects, Isidemargin, Image |
| Attribute | Reverse truefalse |

As shown in Table 2, the position of a picture object may be identified by preset XPos and YPos values indicating the position within a group. Here, the group may be a paragraph or a page. A given picture object may belong to a paragraph, which may then belong to a page. Hence, it is possible to identify the page to which a given picture object belongs in a document. Accordingly, information on a given picture object may be relatively represented on the composite scroll bar.

TABLE 2

| Shapecomponent | | | | |
|---|---|---|---|---|
| Description | Entity element attribute | | | |
| Parent element | Picture, Drawingobject | | | |
| Child element | Parameterset, Rotationinfo, Renderinginfo | | | |
| Attribute | HRef | Hyperlink attribute, Hyperlink field same as Command attribute of control | | |
| | XPos | X offset in group to which entity belongs | [hwpunit] | 0 |
| | YPos | Y offset in group to which entity belongs | [hwpunit] | 0 |
| | GroupLevel | Number of grouping | | 0 |
| | OriWidth | Initial width at entity creation | [hwpunit] | |
| | OriHeight | Initial height at entity creation | [hwpunit] | |
| | CurWidth | Current width of entity | [hwpunit] | |
| | CurHeight | Current height of entity | [hwpunit] | |
| | HorzFlip | Horizontally flipped state? | true\|false | false |
| | VertFlip | Vertically flipped state? | true\|false | false |
| | IINstID | | | |

In addition, for hypertext such as OLE object, element definitions shown in Table 3 are provided, and position values are provided by source information of the document. Hence, the mobile terminal 100 may identify information elements including a picture object and OLE object on the basis of defined values extracted from document source information and obtain information on relative positions thereof in the whole document.

TABLE 3

| OLE | | | |
|---|---|---|---|
| Description | OLE | | |
| Parent element | Test | | |
| Child element | Shapeobject, Shapecomponent, Lineshape | | |
| Attribute | ObjectType | Type of OLE entity | Unknown \| Embedded \| Link \| Static \| Equation |
| | ExtentX | | |
| | ExtentY | | |
| | BinItem | | |
| | DrawAspect | | Content \| ThumbNail \| Icon \| DocPrint |
| | HasMoniker | | true \| false        false |
| | Eqbaseline | | |

Source information illustrated in Tables 1 to 3 is information provided by the "hwp" word processor. Other word processors may define types and positions of information elements in a similar manner. Hence, the mobile terminal 100 may pre-store information regarding content definition values for a particular word processor according to the document extension, obtain information on positions of information elements contained in a document on the basis of the pre-stored information, and output a composite scroll bar of the present disclosure.

Referring to FIG. 11, in response to generation of an event for document page output according to a user request or preset scheduling information, the mobile terminal 100 may output a document page 142 on the display unit 140 as indicated by indicia 1101. Here, the document page 142 output on the display unit 140 for search may be composed of all pages in the document. For example, if a document file requested for output is composed of twenty (20) pages, the document page 142 may be composed of twenty (20) pages.

In response to a request for document file output, the mobile terminal 100 may classify contents of the document page 142 into information elements and assign indexes to the information elements according to types thereof. For example, the mobile terminal 100 may identify information elements such as text, image and link in the document page 142. The mobile terminal 100 may assign indexes to images and links other than text. In a state indicated by indicia 1101, as the document page 142 contains two images and two links as information elements, two image indexes 22-1 and 22-2 and two link indexes 23-1 and 23-2 are contained in the composite scroll bar 30.

The user may select the first image index 22-1 as indicated by indicia 1103 while viewing, for example, a beginning part of the document page 142. Then, the mobile terminal 100 may output a first previous position mark 51 at a portion of the composite scroll bar 30 corresponding to the currently viewed page region and perform movement to a page region containing an image associated with the first image index 22-1. Here, the mobile terminal 100 outputs a page region containing the image associated with the first image index 22-1 as indicated by indicia 1105.

After viewing the image by selecting the first image index 22-1, the user may select a specific position of the composite scroll bar 30. Then, the mobile terminal 100 may output a page region corresponding to the selected position of the composite scroll bar 30 on the display unit 140. Here, the mobile terminal 100 may delete the first previous position mark 51 from the display unit 140 and output a second previous position mark 52 at the previously selected position (i.e., first image index 22-1). In other words, the mobile terminal 100 may maintain only one previous position mark on the composite scroll bar 30. For example, when a first link index 23-1 is selected after selection of the first image index 22-1, the mobile terminal 100 may output a previous position mark at the first image index 22-1. Thereafter, when the first image index 22-1 is reselected, the mobile terminal 100 may output a previous position mark at the first link index 23-1. In the scheme depicted in FIG. 11, the previous position mark is placed only at a position before the last selection is made. Hence, it is possible to freely perform movement to a different page region with a simplified return to a previous position, thereby facilitating a relatively simple page search.

The scheme for return to a previous position may be determined according to user settings. To this end, the mobile terminal 100 may provide a menu for selecting one of return schemes and apply a selected return scheme. Here, the mobile terminal 100 may provide a tutorial for the selected return scheme.

FIG. 12 illustrates various output forms for a composite scroll bar according to an embodiment of the present disclosure. In particular, FIG. 12 depicts characteristics of a region to which a composite scroll bar is applied through referencing of a server page platform.

Referring to FIG. 12, HTML5 may be applied to a server page such as a web page on the basis of the Model-view-controller (MVC) model. An HTML5 page may have contents written in HTML and a layout described in CSS. As shown, the HTML5 page layout may be composed of various elements such as <header>, <nav>, <aside>, <section> and <footer>. The element <section> may include elements <header>, <article> and <footer>. During content analysis for index assignment, the mobile terminal 100 may analyze, for example, a region corresponding to the element <section> only. The mobile terminal 100 may create a composite scroll bar for the analyzed region and output the composite scroll bar. Here, the mobile terminal 100 may output the composite scroll bar only within the region corresponding to the element <section> or output the same fully along the upper right edge and lower right edge of the display unit 140. That is, the mobile terminal 100 may restrict or adjust the size or output position of a composite scroll bar. If necessary, the mobile terminal 100 may analyze a region corresponding to the element <aside> and output a composite scroll bar accordingly.

Figure 13:
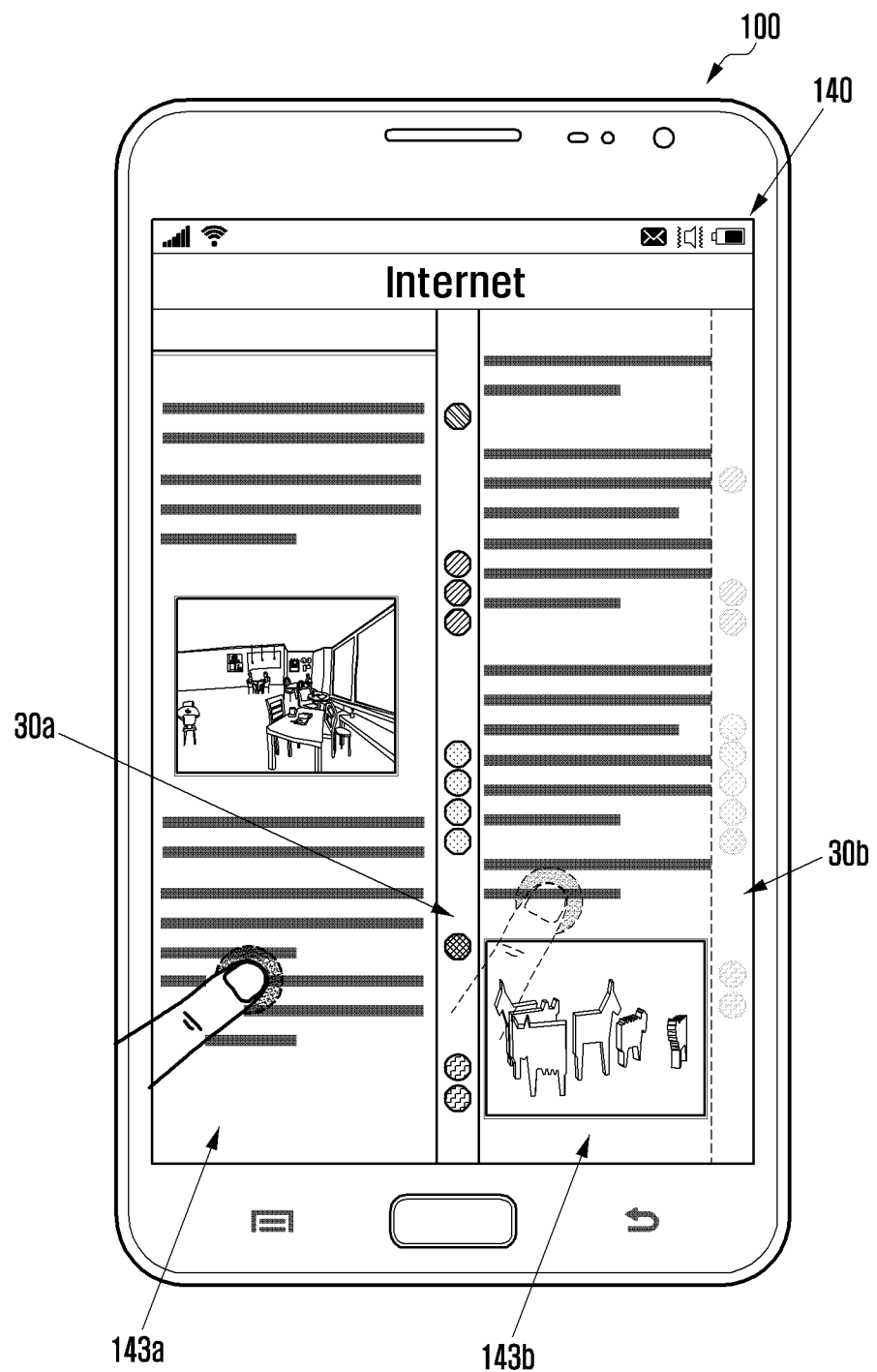
FIG. 13 illustrates usage of multiple composite scroll bars during page search according to the present disclosure.

FIG. 13 illustrates usage of multiple composite scroll bars or selective usage thereof in the enhanced page search function according to the present disclosure.

Referring to FIG. 13, the mobile terminal 100 may analyze a requested page in response to a page request. Here, the mobile terminal 100 may analyze sections of the page to output a composite scroll bar. For example, to output a page 141 composed of multiple sections 143a and 143b, the mobile terminal 100 may analyze contents of at least one of the sections 143a and 143b, and perform index assignment and output a composite scroll bar according to the analysis result. Here, the sections 143a and 143b may each be scrolled independently.

Assuming that the page 141 is composed of two sections 143a and 143b, the mobile terminal 100 may analyze contents of the first section 143a (selected by default from the two sections 143a and 143b) and assign indexes to identified information elements of the first section 143a. Thereafter, the mobile terminal 100 may create a composite scroll bar 30a for the first section 143a, and output the composite scroll bar 30a on a region of the first section 143a displayed on the display unit 140. Hence, the mobile terminal 100 may output the composite scroll bar 30a only for the first section 143a when the page 141 is output.

When the user makes a touch gesture on the second section 143b, the mobile terminal 100 may output a composite scroll bar 30b for the second section 143b. To this end, upon generation of a touch gesture to view the second section 143b, the mobile terminal 100 may analyze contents of the second section 143b, perform index assignment and create the composite scroll bar 30b. Alternatively, the mobile terminal 100 may create the composite scroll bar 30a and composite scroll bar 30b for the sections 143a and 143b at the time when the page 141 is received. Thereafter, when the user selects one of the sections 143a and 143b, the mobile terminal 100 may output a composite scroll bar for the selected section. When the user selects the second section 143b, the mobile terminal 100 may output the composite scroll bar 30b and remove the composite scroll bar 30a from the display unit 140. The mobile terminal 100 may sustain output of the composite scroll bar 30a by default and remove the composite scroll bar 30b from the display unit 140 upon de-selection. The mobile terminal 100 may merge the composite scroll bar 30a and composite scroll bar 30b and output the merged composite scroll bar only at the region of the composite scroll bar 30b. Here, among the composite scroll bars 30a and 30b, the composite scroll bar to be output at the region of the composite scroll bar 30b may be determined according to user selection or the section currently viewed by the user among the sections 143a and 143b. The composite scroll bar for a default section may be output at the region of the composite scroll bar 30b when the section currently viewed by the user is not identified. Alternatively, for ease of control, the mobile terminal 100 may arrange multiple composite scroll bars for individual sections on a central region of the display unit 140. For example, the composite scroll bar 30b may be placed close to the composite scroll bar 30a. The composite scroll bars 30a and 30b may be arranged in a direction (e.g. horizontal) different from the direction of the corresponding sections (e.g. vertical). For example, each composite scroll bar 30a or 30b may be arranged in a horizontal direction as an overlay on an upper or lower region of the corresponding section.

In addition, the mobile terminal 100 may provide composite scroll bars to the sections 143a and 143b by default through analysis of contents and index assignment. That is, upon reception of a page 14 composed of multiple sections, the mobile terminal 100 may analyze contents of individual sections, assign indexes to information elements of each section, and output multiple composite scroll bars at the same time for the sections. Simultaneous output of multiple composite scroll bars may be performed differently according to designer settings.

Figure 14:
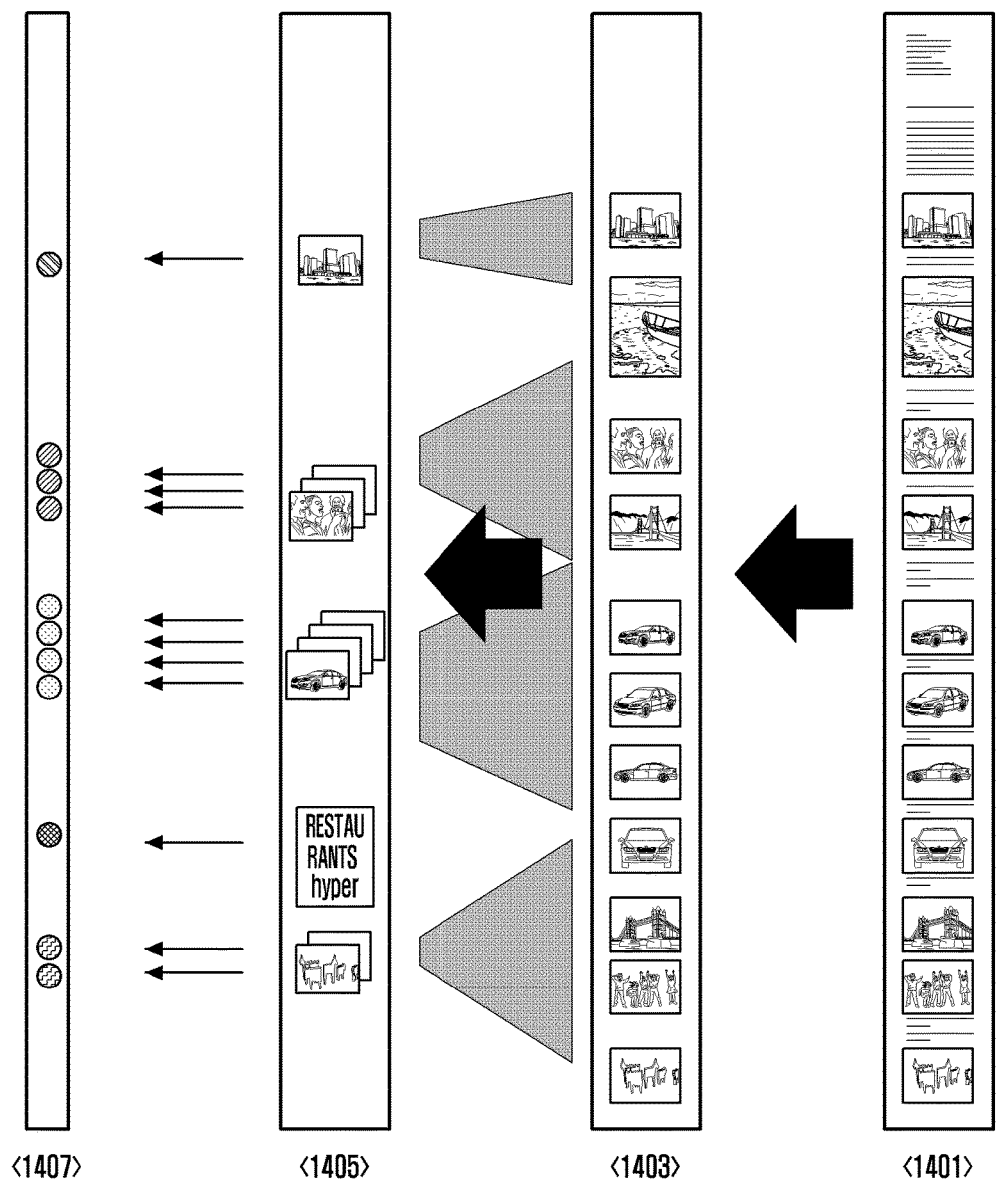
FIG. 14 illustrates realization of a composite scroll bar according to the present disclosure.

FIG. 14 illustrates another realization of a composite scroll bar according to an embodiment of the present disclosure.

As described before, the mobile terminal 100 may receive thumbnail images from a server apparatus as part of page reception or may generate thumbnail images on the basis of contents or information elements of a received page. Thus, the mobile terminal 100 may obtain information composed of only thumbnail images corresponding to a specific page. That is, the mobile terminal 100 may create a composite scroll bar using collected thumbnail images without direct analysis of contents of a page. Here, each thumbnail image has data on the position of a corresponding information element in the page.

More specifically, when thumbnail images are collected as indicated by indicia 1401, the mobile terminal 100 may classify information elements excluding an information element of a given type such as text as indicated by indicia 1403. Thereafter, the mobile terminal 100 may arrange the thumbnail images while permitting overlap on the scroll bar region in consideration of positions of corresponding information elements within the page as indicated by indicia 1405.

After arrangement of thumbnail images, the mobile terminal 100 may assign indexes to information elements associated with the thumbnail images, and arrange the indexes on the scroll bar region of a given shape to thereby create a composite scroll bar of a basic type as indicated by indicia 1407. Here, as indicated by indicia 1405, an entity of thumbnail images arranged on the scroll bar region may be used as a composite scroll bar of a different type.

In the above description, text, images and links are used as content types. In the present disclosure, other content types may also be used for classification of information elements. For example, the mobile terminal 100 may treat tables, equations, and figures contained in a page as a separate information element and may assign indexes thereto.

As described hereinabove, the enhanced page search function of the present disclosure may classify contents of a page into information elements and provide a composite scroll bar containing indexes corresponding to the information elements. Hence, the user may readily identify types and positions of information elements contained in a page region currently not displayed, and move to a page region containing a desired information element in a rapid and easy manner. The enhanced page search function of the present disclosure supports easy return to a previous page region, facilitating movement to or referencing of a different region of the page.

Meanwhile, the mobile terminal 100 may further include various components according to design. For example, when the mobile terminal 100 is a communication terminal, the mobile terminal 100 may further include a local area communication module for local area communication, a data communication interface based on wired and wireless communication, an Internet communication module for Internet access and communication, and a digital broadcast reception module for receiving and playing digital broadcasts. Although possible variations according to the trend of digital convergence are too numerous to enumerate, it should be apparent to those skilled in the art that the mobile terminal 100 may further include a unit comparable to the above-described units, and one unit of the mobile terminal 100 may be removed or replaced with another unit.

The mobile terminal 100 of the present disclosure may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smartphone, a laptop computer, or a handheld computer.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A page search method for an electronic device, comprising:
    identifying types and positions of information elements contained in a page to be output on a display unit of the electronic device by examining source information associated with the page;
    assigning indexes to the information elements, wherein the indexes are distinctly assigned according to the types of the information elements, wherein the assigning of the indexes comprises assigning thumbnail images as the indexes to the information elements;
    arranging the indexes on a scroll bar region corresponding to the page based on the identified positions of the information elements;
    outputting a composite scroll bar containing the scroll bar region on which the indexes are arranged,
    wherein in response to an input for an index selection generated at a position of the composite scroll bar being selected by touching the position, the display outputs, a page region corresponding to the selected position, and wherein in response to a simultaneous touch selection of a plurality of thumbnail images, outputting an additional scroll region with a corresponding quantity of categories of thumbnail images separately arranged at regular intervals.

2. The page search method of claim 1, further comprising receiving a page output request, wherein the receiving of the page output request comprises receiving a server page request after access to a server page in which thumbnail images related to information elements of the server page are received before actual content of the server page are completely received and creating the composite scroll bar on a basis of the thumbnail images, and receiving a document page request after invocation of a document file.

3. The page search method of claim 1, wherein the assigning of the indexes further comprises at least one of
    assigning indexes having shapes or colors indicating types of the information elements to the information elements; and
    assigning images as the indexes to the information elements, wherein the images have characters or numbers indicating types of the information elements.

4. The page search method of claim 1, wherein the assigning of the indexes comprises assigning the indexes to the information elements excluding an information element of a given type in consideration of type of the information element.

5. The page search method of claim 1, wherein the arranging of the indexes further comprises merging indexes within a given distance, among the indexes arranged on the scroll bar region, into a combined index.

6. The page search method of claim 5, further comprising:
    outputting a composite scroll bar containing the combined index.

7. The page search method of claim 6, wherein the outputting of the additional scroll region comprises replacing the indexes in the additional scroll region with thumbnail images corresponding to information elements indicated respectively by the indexes.

8. The page search method of claim 6, further comprising:
    receiving an event to enlarge or reduce the additional scroll region; and
    enlarging or reducing the additional scroll region upon reception of the event.

9. The page search method of claim 8, further comprising adjusting, when the additional scroll region is changed, shapes of the indexes according to a size of a changed additional scroll region.

10. The page search method of claim 5, further comprising outputting numerical information indicating a number of indexes merged in the combined index.

11. The page search method of claim 1, further comprising:
    changing, upon switching between a portrait mode and a landscape mode, a size of the scroll bar region; and
    adjusting positions of the indexes according to a changed scroll bar region.

12. The page search method of claim 11, further comprising one Of:
    merging the indexes into a combined index in response to a gap between indexes in the scroll bar region being decreased down to less than a preset distance according to position adjustment; and
    demerging a combined index into individual indexes in response to the gap between indexes in the scroll bar region being increased up to more than a preset distance according to position adjustment.

13. An electronic device supporting page search, comprising:
    a display unit configured to output a page containing information elements and a composite scroll bar containing indexes corresponding to the information elements; and
    a controller configured to control a process of identifying types and positions of information elements in the page by examining source information associated with the page, assigning distinct indexes to the information elements according to the types of the information elements, wherein the assigning of the distinct indexes comprises assigning thumbnail images as the distinct indexes to the information elements, arranging the indexes on a scroll bar region corresponding to the page based on the identified positions of the information elements, and outputting a composite scroll bar containing a scroll bar region, corresponding to the page, on which the indexes are arranged,
    wherein in response to an input for an index selection generated at a position of the composite scroll bar being selected by touching the position, the display outputs, a page region corresponding to the selected position, and wherein in response to a simultaneous touch selection of a plurality of thumbnail images, the display outputs, an additional scroll bar region with a corresponding quantity of categories of thumbnail images separately arranged at regular intervals.

14. The electronic device of claim 13, further comprising at least one of:
    a communication unit configured to receive a server page request after access to a server page in which thumbnail images related to information elements of the server page are received before actual content of the server page are completely received and creating the composite scroll bar on a basis of the thumbnail images; and
    a storage unit configured to store document page files.

15. The electronic device of claim 13, wherein each of the information elements has a type, and wherein the controller further assigns distinct indexes having shapes or colors indicating the types of the information elements to the information elements.

16. The electronic device of claim 13, wherein each of the information elements has a type, and wherein the controller assigns one or more images indicating types of the information elements as indexes to the information elements.

17. The electronic device of claim 13, wherein the controller assigns distinct indexes to the information elements excluding in consideration of types of the information elements, wherein the indexes exclude information elements of a given type.

18. The electronic device of claim 13, wherein the controller merges distinct indexes within a given distance, among the indexes arranged on the scroll bar region, into a combined index.

19. The electronic device of claim 13, wherein in response to switching between a portrait mode and a landscape mode, the controller changes a size of the scroll bar region, and adjusts positions of the distinct indexes according to a changed size of the scroll bar region.

20. The electronic device of claim 13, wherein in response to multiple distinct indexes in the composite scroll bar being selected with a single touch gesture, the display outputs the additional scroll region.

21. The electronic device of claim 13, wherein the display outputs a previous position mark at a position of the composite scroll bar corresponding to the page region viewed before the position was selected.

22. The electronic device of claim 13, wherein the display further outputs the page region viewed before selection was made upon de-selection of the position.

23. The electronic device of claim 13, wherein in response to a page composed of multiple sections being output, the display perform at least one of outputting a composite scroll bar for each section, outputting a composite scroll bar for a section selected from the multiple sections, and outputting a composite scroll bar for a section selected from the multiple sections and further outputting a composite scroll bar for a newly selected section in response to an input signal for selecting a section is generated.

24. The electronic device of claim 13, further comprising a communication unit configured to receive thumbnail images of information elements contained in the page, and wherein the controller classifies the thumbnail images and assigns distinct indexes to the thumbnail images.

25. The electronic device of claim 13, wherein the controller controls an operation to output the composite scroll bar at the same time when the page is output, output the composite scroll bar in response to an event for requesting the composite scroll bar is generated after output of the page, or output the composite scroll bar in response to a page region configured for a composite scroll bar being selected after output of the page.

\* \* \* \* \*